(12) United States Patent
Hyde et al.

(10) Patent No.: US 11,960,462 B2
(45) Date of Patent: Apr. 16, 2024

(54) REAL-TIME DATA PROCESSING

(71) Applicant: CRFS Limited, Cambridge (GB)

(72) Inventors: Stewart Hyde, Cambridge (GB); Daniel Timson, Cambridge (GB)

(73) Assignee: CRFS LIMITED, Cambridge (GB)

( * ) Notice: Subject to any disclaimer, the term of this patent is extended or adjusted under 35 U.S.C. 154(b) by 0 days.

(21) Appl. No.: 17/800,075

(22) PCT Filed: Feb. 25, 2021

(86) PCT No.: PCT/GB2021/050476
§ 371 (c)(1),
(2) Date: Aug. 16, 2022

(87) PCT Pub. No.: WO2021/171018
PCT Pub. Date: Sep. 2, 2021

(65) Prior Publication Data
US 2023/0086812 A1   Mar. 23, 2023

(30) Foreign Application Priority Data

Feb. 27, 2020   (GB) .................................... 2002803

(51) Int. Cl.
*G06F 16/22*   (2019.01)
(52) U.S. Cl.
CPC ................. *G06F 16/2272* (2019.01)
(58) Field of Classification Search
CPC .................................................. G06F 16/2272
See application file for complete search history.

(56) References Cited

U.S. PATENT DOCUMENTS

| | | | |
|---|---|---|---|
| 8,554,699 B2 * | 10/2013 | Ruhl ..................... | G06F 16/958 |
| | | | 706/12 |
| 9,229,986 B2 * | 1/2016 | Goldstein ......... | G06F 16/24568 |
| (Continued) | | | |

FOREIGN PATENT DOCUMENTS

| | | |
|---|---|---|
| CN | 109902088 A | 6/2019 |
| EP | 3007081 A1 | 4/2016 |
| WO | 2019056568 A1 | 3/2019 |

OTHER PUBLICATIONS

Search and Examination Report of Application No. GB2002803.1, dated Sep. 9, 2020, all pages cited in its entirety.

(Continued)

*Primary Examiner* — Huawen A Peng
(74) *Attorney, Agent, or Firm* — Burr & Forman LLP

(57) ABSTRACT

A method is described which includes receiving or obtaining a time series of data (S1). The method also includes storing the time series of data to a storage device without interrupting the reception of the time series of data (S2). The method also includes, for each of a plurality of base time periods, at the end of a most recently elapsed base time period (S5) and without interrupting the reception or storage of the time series of data, calculating (S6) one or more measurements based on the time series of data corresponding to the most recently elapsed base time period and updating a binary tree structure indexing the one or more measurements and the time series of data. Updating the binary tree structure includes generating a new binary tree leaf (1, 2, 4, 5) corresponding to the most recently elapsed base time period (S7). Updating the binary tree structure also includes, in response to one or more new binary tree nodes (3, 6, 7) could be added to complete a perfect binary sub-tree including the new binary tree leaf 15 (S9), generating (S10) the new binary tree nodes (3, 6, 7). The new binary tree leaf (1, 2, 4, 5) and any new binary tree nodes (3, 6, 7) may be disjoint (Continued)

from one or more existing portions of the binary tree structure. Leaves (1, 2, 4, 5) and nodes (3, 6, 7) of the binary tree structure are read-only once generated. Each binary tree leaf (1, 2, 4, 5) includes one or more pointers to measurements based on the corresponding base time period and each binary tree node (3, 6, 7) comprises one or more pointers to aggregated measurements based on all descendant base time periods.

20 Claims, 13 Drawing Sheets

(56) References Cited

U.S. PATENT DOCUMENTS

| | | | |
|---|---|---|---|
| 10,140,324 B2 | 11/2018 | Massarella et al. | |
| 10,416,971 B2* | 9/2019 | Chun | G06F 8/427 |
| 10,700,934 B2* | 6/2020 | Oba | H04L 12/185 |
| 10,838,061 B1* | 11/2020 | Crouch | G01S 17/32 |
| 11,461,286 B2* | 10/2022 | Godman | G06F 9/467 |
| 2019/0005101 A1* | 1/2019 | Jian | G06F 16/2343 |
| 2020/0210482 A1* | 7/2020 | Becker | G06F 16/9024 |
| 2020/0379955 A1* | 12/2020 | Olderdissen | G06F 16/13 |
| 2021/0319002 A1* | 10/2021 | Ryan | G06F 16/2246 |

OTHER PUBLICATIONS

International Search Report and Written Opinion of International Application No. PCT/GB2021/050476, dated May 28, 2021, all enclosed paged cited.

Junichi Naganawa, et al., "Distributed Spectrum Sensing Utilizing Heterogeneous Wireless Devices and Measurement Equipment", IEEE International Symposium on New Frontiers in Dynamic Spectrum Access Networks, (2011), pp. 173-184, Tokyo, Japan.

Walid Fantazi, et al., "Captree: Spatial and Temporal Indexing in Databases form Fixed Sensors", 4th International Conference on Control Engineering & Information Technology (CEIT), IEEE, Dec. 16-18, 2016 Tunis, Tunisia.

Alvaro Villalba, "Constant-Time Sliding Window Framework with Reduced Memory Footprint and Efficient Bulk Evictions", IEEE Transactions on Parallel and Distributed Systems, (Mar. 2019), pp. 486-500, vol. 30, No. 3.

* cited by examiner

REAL-TIME DATA PROCESSING

FIELD OF THE INVENTION

The present invention relates to analysing and indexing a time series of data concurrently with storing the time series of data.

BACKGROUND

When large volumes of data (e.g. hundreds of Gb or more than 1 Tb) are collected, methods for analysing and displaying the data can be used to assist a user in finding and/or reviewing desired data. For example, a dataset might include gigabytes, terabytes or petabytes of raw data. Methods of data-reduction employed may include pre-processing, index building, and hierarchical searching.

For example, U.S. Pat. No. 8,078,394 B2 describes processing Global Positioning System, GPS, data into a track of spatially-partitioned segments such that each segment has a cell. Each cell has an associated temporal index into which data for the segments of the cell are inserted.

In another example, G. Noël et. al. "The Po-tree: a Real-time Spatiotemporal Data Indexing Structure", Developments in Spatial Data Handling 2005, pp 259-270, 11th International Symposium on Spatial Data Handling, describes indexing measurement data from sensors using a KD tree index for the sensor locations, with spatial nodes corresponding to each sensor linked to a modified B+ tree time index structure for measurements from that sensor.

EP 3007081 B1 describes methods employing a spatial tree index linked to a number of time tree indices.

In other applications, a spatial component of indexing may be omitted and only temporal indexing may be needed.

SUMMARY

According to a first aspect of the invention, there is provided a method including receiving or obtaining a time series of data. The method also includes storing the time series of data to a storage device without interrupting the reception of the time series of data. The method also includes, for each of a plurality of base time periods, at the end of a most recently elapsed base time period and without interrupting the reception or storage of the time series of data, calculating one or more measurements based on the time series of data corresponding to the most recently elapsed base time period and updating a binary tree structure indexing the one or more measurements and the time series of data. Updating the binary tree structure includes generating a new binary tree leaf corresponding to the most recently elapsed base time period. Updating the binary tree structure also includes, in response to one or more new binary tree nodes could be added to complete a perfect binary sub-tree including the new binary tree leaf, generating the new binary tree nodes. The new binary tree leaf and any new binary tree nodes may be disjoint from one or more existing portions of the binary tree structure. Leaves and nodes of the binary tree structure are read-only once generated. Each binary tree leaf includes one or more pointers to measurements based on the corresponding base time period and each binary tree node comprises one or more pointers to aggregated measurements based on all descendant base time periods.

A perfect binary sub-tree only includes binary tree nodes with a degree of two, and all of the binary tree leaves are at the same level. Binary tree nodes may be connected to descendant binary tree nodes or to binary tree leaves using internal pointers. Binary tree nodes may be connected to descendant binary tree nodes or to binary tree leaves by listing one or more index values which corresponding to numberings of the descendant binary tree nodes or leaves within the lower level. The most recently elapsed base time period may be denoted as the $n^{th}$ and the first base time period in the time series may correspond to n=1. One or more measurements corresponding to the $n^{th}$ base time period may be generated in response to the end of the $n^{th}$ time period.

Generating new binary tree nodes in response to one or more new binary tree nodes could be added to complete a perfect binary sub-tree including the new binary tree leaf may include generating all binary tree nodes which can be generated with degree of two. Generating a binary tree node may include generating the aggregated data for that binary tree node.

Dynamically updating the binary tree structure may include generating the new binary tree leaf as an $n^{th}$ leaf corresponding to the $n^{th}$ base time period. The $n^{th}$ binary tree leaf may include one or more external pointers to the corresponding one or more measurements. Dynamically updating the binary tree structure may include determining an integer p corresponding to the largest value of p for which n is equal to or divisible by $2^p$. Dynamically updating the binary tree structure may include, in response to p is greater than zero, generating any binary tree nodes required in order to complete a perfect binary sub-tree of height p which includes each binary tree leaf between and including the $(n-2^p+1)^{th}$ to $n^{th}$ binary tree leaves. Each binary tree node may include one or more external pointers to the corresponding one or more aggregated measurements. Each aggregated measurement may be based on the time series of data corresponding to all binary tree leaves descending from that binary tree node. Each aggregated measurement may be determined based on measurements and/or aggregated measurements corresponding to the descendant binary tree nodes and/or binary tree leaves.

Each binary tree leaf may also include an external pointer to the data corresponding to the respective base time period. The external pointer to the data corresponding to the respective base time period may point to a file stored by the storage device and corresponding to the respective base time period. The external pointer to the data corresponding to the respective base time period may point to a position within a file stored by the storage device and corresponding to a number of base time periods including the respective base time period.

The method may also include, in response to termination of the time series of data, generating a final binary tree leaf corresponding to the time series of data received since the last completely elapsed base time period, and generating any binary tree nodes required to link all existing portions of the binary tree structure to a single binary tree root node.

The binary tree root node may, if necessary, be generated in response to termination of the time series of data. The binary tree root node may be generated in the same way as any other binary tree node. Binary tree nodes generated in response to termination of the time series of data may have a degree of one or two. The completed binary tree structure may be imperfect.

The method may also include receiving a user query during reception of the time series of data, the query specifying a query time period. The method may also include generating any temporary binary tree nodes required to link all existing portions of the binary tree structure to a single temporary binary tree root node. The method may also include using the binary tree structure and the temporary binary tree nodes to determine or retrieve measurements, aggregated measurements and/or data corresponding to the query time period.

The user query may be manually entered/inputted. The user query may be automatically generated. The temporary binary tree root node may, if necessary, be generated in response to receiving the user query. The temporary binary tree root node may be generated in the same way as any other binary tree node. Temporary binary tree nodes generated in response to receiving a user query may have a degree of one or two. The temporary binary tree nodes are not part of the binary tree structure. The user query may be input to, or generated by, a remote client. The method may be carried out by a server and the user query may be received from a client. The retrieved measurements and/or aggregated measurements may be transmitted to the client. New temporary binary tree nodes may be generated in response to each new user query. Temporary binary tree nodes may be deleted upon completion of a user query.

Using the binary tree structure and the temporary binary tree nodes to retrieve measurements, aggregated measurements and/or data corresponding to the query time period may include determining whether the query time period exceeds a threshold value. In response to the query time period exceeds the threshold value, the method may include using the binary tree structure and the temporary binary tree nodes to retrieve measurements and/or aggregated measurements corresponding to the query time period. In response to the query time period does not exceed the threshold value, the method may also include using the binary tree structure and the temporary binary tree nodes to retrieve the portion of the time series of data corresponding to the query time period, and calculating one or more query measurements based on the time series of data corresponding to the query time period.

The one or more query measurements may be the same as the one or more measurements. The one or more query measurements may overlap with the one or more measurements. One of more of the query measurements may be in common with the measurements and/or the aggregated measurements. The one or more query measurements may be different to the one or more measurements. When a query measurement corresponds to one of the measurements, the query measurement may be determined using the same or different parameters to the measurement. For example, the one or more measurements may include obtaining 50% overlap fast Fourier transforms of the time series of data corresponding to the respective base time period and the one or more query measurements may include obtaining 50% overlap fast Fourier transforms of the time series of data corresponding to the query time period, and the windows and/or overlap percentages for the fast Fourier transforms may be the same or different. Determining one or more query measurements based on the time series of data corresponding to the query time period may include obtaining windowed or overlapped fast Fourier transforms having more than 50% overlap. Parameters relevant to determining the one or more query measurements may be included in the user query. Determining one or more query measurements based on the time series of data corresponding to the query time period may include obtaining overlapped fast Fourier transforms using a window width and/or a window overlap percentage specified in the user query.

The method may also include presenting information obtained in response to the user query on a display.

The method may applied to two or more time series of data in parallel.

The one or more measurements may include information obtained based on fast Fourier Transform overlap processing applied to the time series of data corresponding to the most recently elapsed base time period. The one or measurements may include one or more spectra.

The time series of data may take the form of in-phase and quadrature, IQ, data received from one or more radio receivers.

The time series of data may take the form of data received from any type of measurement device or sensor such as, for example, an oscilloscope, an oscilloscope probe, a datalogger, a voltage sensor, a current sensor, an optical sensor, a vibration sensor, an accelerometer, a pH sensor, a flowmeter for a fluid (gas or liquid), a seismometer, and so forth.

The storage device may include two or more non-transitory computer readable media. The storage device may include one or more hard disc drives. The storage device may include a plurality of hard disc drives configured as a Redundant Array of Independent Discs (RAID). The storage device may include one or more solid-state hard disc drives. The storage device may include a plurality of solid state hard disc drives configured as a Redundant Array of Independent Discs (RAID).

The method may be carried our using one or more digital electronic central processing units (CPUs).

According to a second aspect of the invention, there is provided a computer program product configured to cause a data processing apparatus connected to one or more storage devices to execute the method of the first aspect.

According to a third aspect of the invention, there is provided a method including receiving one or more preview parameters. The preview parameters include a preview bandwidth. The method also includes controlling one or more radio receivers to perform a frequency sweep and obtain preview spectrum information spanning the preview bandwidth. The method also includes displaying the preview spectrum information. The method also includes receiving a selection of one or more frequency bands. The method also includes tuning each of the one or more radio receivers to one of the selected frequency bands. The method also includes acquiring a time series of data from the one or more radio receivers and applying the method according to the first aspect.

According to a fourth aspect of the invention, there is provided a computer program product configured to cause a data processing apparatus connected to one or more storage devices and one or more radio receivers to execute the method of the third aspect.

According to a fifth aspect of the invention, there is provided an apparatus including a storage device, one or more processors and memory. The apparatus is configured to receive or obtain a time series of data. The apparatus is also configured to store the time series of data to the storage device without interrupting the reception of the time series of data. The apparatus is also configured to, for each of a plurality of base time periods, at the end of a most recently elapsed base time period and without interrupting the reception or storage of the time series of data, calculate one or more measurements based on the time series of data corresponding to the most recently elapsed base time period, and update a binary tree structure indexing the one or more measurements. Updating the binary tree structure includes generating a new binary tree leaf corresponding to the most recently elapsed base time period. Updating the binary tree structure also includes, in response to one or more new binary tree nodes could be added to complete a perfect binary sub-tree structure including the new binary tree leaf, generating the new binary tree nodes. The new binary tree leaf and any new binary tree binary tree nodes may be disjoint from one or more existing portions of the binary tree structure. Leaves and nodes of the binary tree structure are read-only once generated. Each binary tree leaf includes one or more pointers to measurements based on the corresponding base time period and each binary tree node includes one or more pointers to aggregated measurements based on all descendant base time periods.

The apparatus may include features corresponding to, or implementing, any features of the method of the first and/or third aspects.

In response to termination of the time series of data, the apparatus may be further configured to generate a final binary tree leaf corresponding to the time series of data received since the last completely elapsed base time period, and generate any binary tree nodes required to link all existing portions of the binary tree structure to a single binary tree root node.

The apparatus may be further configured to receive a user query during reception of the time series of data, the query specifying a query time period. The apparatus may be further configured to generate any temporary binary tree nodes required to link all existing portions of the binary tree structure to a single temporary binary tree root node. The apparatus may be further configured to use the binary tree structure and the temporary binary tree nodes to retrieve measurements, aggregated measurements and/or data corresponding to the query time period.

Using the binary tree structure and the temporary binary tree nodes to retrieve measurements, aggregated measurements and/or data corresponding to the query time period may include determining whether the query time period exceeds a threshold value. In response to the query time period exceeds the threshold value, the apparatus may be configured to use the binary tree structure and the temporary binary tree nodes to retrieve measurements and/or aggregated measurements corresponding to the query time period. In response to the query time period does not exceed the threshold value, the apparatus may be configured to use the binary tree structure and the temporary binary tree nodes to retrieve the portion of the time series of data corresponding to the query time period, and calculate one or more query measurements based on the time series of data corresponding to the query time period.

The apparatus may be further configured to cause information obtained in response to the user query to be displayed to a user.

The apparatus may include a display, and the display may display the information obtained in response to the user query. The apparatus may transmit information obtained in response to the user query to a user client over one or more networks, and a display of the user client may display the information obtained in response to the user query.

The apparatus may include one or more radio receivers. The time series of data may take the form of IQ data received from one or more radio receivers.

The apparatus may include one or more data sources configured for generating or obtaining a time series of data. A data source may take the form of an oscilloscope, an oscilloscope probe, a data-logger, a voltage sensor, a current sensor, an optical sensor, a vibration sensor, an accelerometer, a pH sensor, a flow-meter for a fluid (gas or liquid), a seismometer, and so forth. The apparatus may include two or more different types of data source.

The apparatus may be configured to process two or more time series of data in parallel.

The one or more measurements may include information obtained based on fast Fourier Transform overlap processing applied to the time series of data corresponding to the most recently elapsed base time period.

A system may include the apparatus and one or more user clients configured for communication with the apparatus.

A user client may be local and may be connected directly to, or integrated with, the apparatus. A user client may be remote and may be connected to the apparatus via one or more networks.

A system may include one or more data collection nodes, each data collection node including an apparatus according to the fifth aspect. The system may also include a server configured for communication with each of the one or more data collection nodes. The system may also include one or more user clients configured for communication with the server.

A data collection node may be connected directly to, or integrated with, the server. A data collection node may be connected to the server via one or more networks. A user client may be local and may be connected directly to, or integrated with, the server. A user client may be connected to the server via one or more networks. Each data collection node may include a data source for receiving or obtaining a time series of data. A data source may take the form of a radio receiver, a camera, an oscilloscope or oscilloscope probe, a data-logger, a voltage sensor, a current sensor, an optical sensor, a vibration sensor, an accelerometer, a pH sensor, a flow-meter for a fluid (gas or liquid), a seismometer, or any other type of sensor capable of outputting a detectable signal.

For each data collection node, during reception of time series of data, that data collection node may transmit newly generated binary tree nodes to the server, and the server may store a local copy of the binary tree structure stored by that data collection node.

For each data collection node, during reception of time series of data, that data collection node transmits newly generated measurements and/or aggregated measurements to the server, and the server stores a local copy of measurements and/or aggregated measurements corresponding to the binary tree structure stored by that data collection node.

One or more networks may include the internet.

BRIEF DESCRIPTION OF THE DRAWINGS

Certain embodiments of the present invention will now be described, by way of example, with reference to the accompanying drawings in which.

DETAILED DESCRIPTION OF CERTAIN EMBODIMENTS

Figure 1:
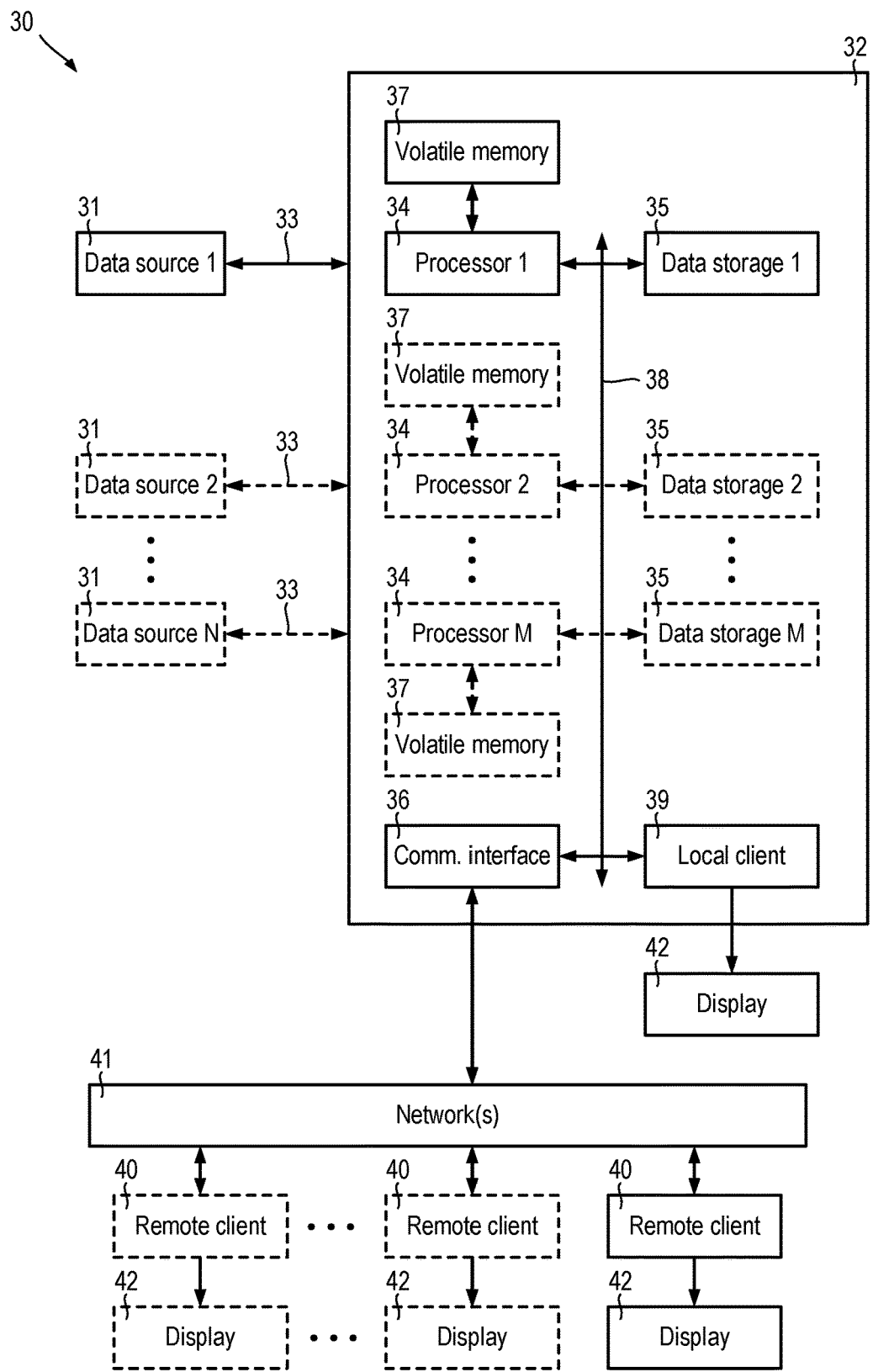
FIG. 1 illustrates a system for processing one or more time series of data.

In the following description, like parts are denoted by like reference numerals.

This specification is concerned with binary tree structures for indexing time series of data, and the following terminology may be used herein. A binary tree herein is formed from a number of binary tree nodes, each of which may have between zero and two edges which connect to binary tree nodes at a lower level of the tree structure. The number of edges leaving a binary tree node may be referred to as the degree of that binary tree node. A binary tree node having a degree of zero may be referred to as a leaf (plural leaves, sometimes also referred to as "end" nodes). The highest level binary tree node in a binary tree may be referred to as a binary tree root node. The intermediate binary tree nodes connecting between a binary tree root node and the binary tree leaves descending from that binary tree root node may simply be referred to as binary tree nodes (or alternatively as binary tree "branch" nodes). Binary tree nodes and binary tree root nodes may sometimes also be referred to as "internal" nodes, in contrast to binary tree leaves.

The lower level binary tree nodes connected by edges to a binary tree node may be referred to as the children of that binary tree node, which itself may be referred to as the parent of the connected lower level binary tree nodes. The depth of a binary tree node or leaf may refer to the number of edges which must be traversed moving from the binary tree root node to that binary tree node or leaf. The height of a binary tree node may refer to the number of edges which must be traversed moving from the deepest leaf to that binary tree node. The height of a binary tree overall may refer to the height of the binary tree root node of that binary tree. A level of a binary tree may refer to all the binary tree nodes or leaves having the same depth or same height. All binary tree nodes and leaves which may be reached from a particular binary tree node may be referred to as descendants of that binary tree node, and that binary tree node itself may be referred to as an ancestor of the descendant binary tree nodes and/or leaves.

A binary tree structure may refer herein to one or more binary trees (sometimes also referred to as binary sub-trees) which are disjoint from one another, in other words a binary tree structure which is disjoint may include more than one root node, and two root nodes of different binary (sub-) trees may have different heights. A binary tree (binary sub-tree) forming part of a binary tree structure may include, at minimum, a single node which is both a leaf and a root node. A binary tree structure may be referred to as "completed" or "connected" if it contains a single binary tree root node, i.e. if the entire binary tree structure forms a single binary tree.

A full binary tree, or a full binary sub-tree of a binary tree structure, (sometimes also termed "proper" or "plane") may refer to a binary tree in which every binary tree node has a degree of either two (branch or root node) or zero (leaf).

A perfect binary tree (or perfect binary sub-tree) of a binary tree structure may refer to a binary tree in which all binary tree nodes and the binary tree root node (i.e. all interior nodes) have a degree of two, and in which all the binary leaves have the same depth or same level. A portion of a binary tree descending from a particular binary tree node may be referred to as a perfect portion if that binary tree node and all descendant binary tree nodes have a degree of two and all descendant leaves are at the same depth or same level.

Disjoint binary tree structures described herein may include one or more perfect binary trees (also referred to as perfect binary sub-trees) having differing heights and which are not connected to one another, and may also include a single binary tree leaf which is not connected to any of the perfect binary (sub-) trees.

Processing a large dataset to produce indices and summary data can be time consuming. When an extended time series of data had finished collecting/recording, a user must wait for a large volume of data, typically terabytes, petabytes or even more, to be processed and indexed before they can begin analysing the data. Such processing may extend for hours or even days, depending on the volume of data. In many applications, in particular diagnostic or detection applications, it would advantageous to be able to analyse recorded data as soon as possible, or to be able to conduct real time analysis during the data collection.

The present specification is concerned with a novel method for building a binary tree structured index and corresponding summary data concurrently with acquisition and storage of a time series of data. The methods of the present specification enable a user to begin analysing data almost immediately after acquisition, or even during acquisition without interrupting reception and storage of a time series of data. Although there are conventional methods for inserting new nodes into a binary tree structure, conventional methods typically require updating previously generated nodes. This can be time consuming, especially as the tree grows larger, and may be further complicated if each node should also point to corresponding summary data (which may require re-calculation if the node is updated). In contrast, the methods of the present specification are optimised for live, or real time, indexing because each binary tree leaf or binary tree node is read-only once generated. Further distinctive details of the new method of indexing and analysing a time series of data in real-time shall become apparent from the descriptions hereinafter.

Referring to FIG. 1, a system 30 is shown.

The system 30 includes one or more data sources 31 in communication with an apparatus 32 via corresponding links 33. The apparatus 32 includes one or more processors 34, one or more storages devices 35 and a communications interface 36. Each processor 34 has associated volatile memory 37 accessible by that processor 34. Each processor 34 has a corresponding data storage device 35. The number, M, of processors 34 is preferably equal to the number, N, of data sources 31, so that each processor 34 may be dedicated to processing a time series of data from a particular data source 31. However, depending on the computational capacity of each processor 34 and the bit-rate from each data source 31, a processor 34 may process data from two or more data sources 31 in some examples for which N>M.

When the apparatus 32 includes two or more processors 34, they may be integrated in a single data processing device, for example sharing a common bus 38 (as illustrated in FIG. 1). Alternatively, when the apparatus 32 includes two or more processors 34, each processor 34 may be provided as a separate data processing device including a corresponding data storage device 35 and volatile memory 37, and the multiple data processing devices may be stacked (or racked) or otherwise interconnected to provide the apparatus 32.

The system 30 includes a client which may take the form of a local client 39 integrated with or connected to the apparatus 32, and/or one or more remote clients 40 connected to the apparatus 32 via the communications interface 36 and one or more wired or wireless networks 41. The one or more wired or wireless networks 41 may include the internet. Each local or remote client 39, 40 is connected to a display 42, or some other suitable output device, in order to present information received from the apparatus 32 to a user. Each local or remote client 39, 40 may be configured to receive and/or generate user queries and to transmit the user queries to the apparatus. A user query may be manually input by a user, for example by providing input to a graphical user interface (GUI) or using an electronic form. Alternatively, a user query may be automatically generated and submitted by an analysis program (not shown) being executed by the local or remote client 39, 40. For example, an analysis program (not shown) may utilise an application program interface (API) for data queries to formulate and submit user queries to the apparatus 32. Herein, the term "user query" may be used to encompass manually entered user queries and also user queries which are automatically generated, for example by an analysis program (not shown) being executed by the local or remote client 39, 40.

Each processor 34 may be a single core processor or a multi-core processor. When two or more processors 34 are used, each processor 34 preferably does not correspond to different cores of a single processor unit/chip. Each processor 34 may take the form of one or more digital, electronic programmable central processing units (CPUs) capable of executing code read from a non-transitory medium or a memory (for example data storage device 35 and/or volatile memory 37) to perform the functions and operations taught herein. Alternatively, each processor 34 and the corresponding volatile memory 37 may be provided by a corresponding microcontroller. In other examples, the methods described hereinafter may be performed using processors 34 and volatile memories 37 implemented using any suitable digital signal processing circuit, such as a system-on-a-chip, application specific integrated circuit (ASIC) or field-programmable gate array (FPGA).

Each data storage device 35 may take the form of one of more non-transitory computer readable media such as, for example, hard disc drives (HDD) and/or solid state drives (SSD). Each data storage device 35 may take the form of a number of HDDs configured as a Redundant Array of Independent Discs (RAID), or a number of SSDs arranged in a RAID configuration.

The links 33 connecting the data sources 31 to the apparatus 32 may take the form of physical connections such as, for example, Ethernet connections, optical fibre links, co-axial cables and so forth. Alternatively, some or all of the links 33 may take the form of wireless links. The links 33 may include one or more networks such as, for example, mobile phone networks, the internet, local area networks, and so forth. The links 33 should be sufficient to transfer the data bit-rate output by the data sources 31. In applications where provision of reliable and/or sufficiently high bandwidth links 33 is not possible, processing may be devolved to data nodes 66 (FIGS. 9, 10) integrating a data source 31 with the processing 69 (FIG. 9), memory 71 (FIG. 9) and storage 70 (FIG. 9) necessary to perform some or all of the steps of the data processing methods described herein.

Figure 2:
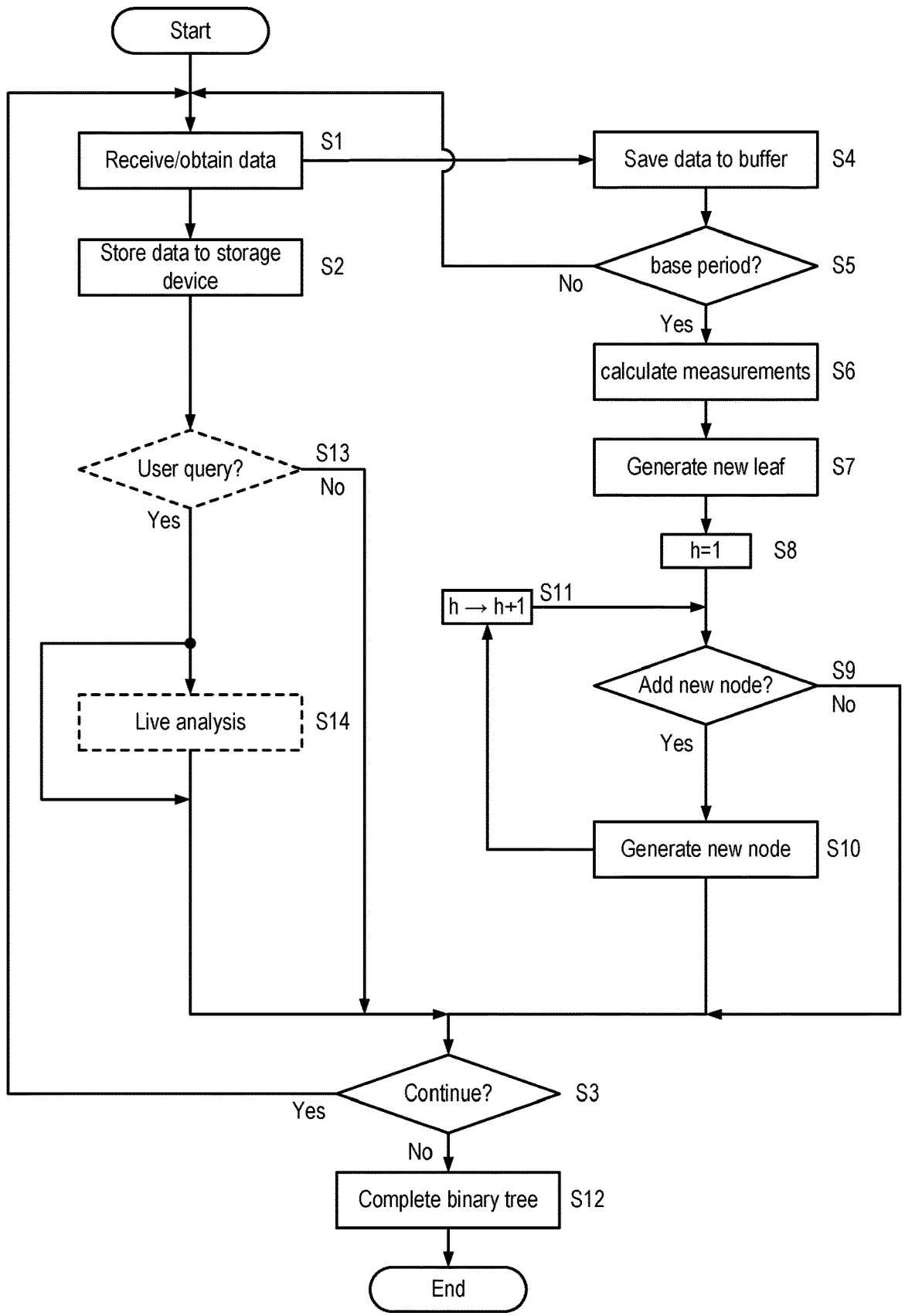
FIG. 2 is a process flow diagram for a method of recording, analysing and indexing a time series of data.

Referring also to FIG. 2, a method of analysing and indexing a time series of data is illustrated. The method may be carried our using one or more processors 34 of the apparatus 32. When the apparatus 32 includes more than one processor 34, each processor 34 may execute a separate instance of the method to process a corresponding time series of data.

The apparatus 32 receives a time series of data from a data source 31 (step S1). Alternatively, the apparatus 32 may use or control a data source 31 to obtain a time series of data using the data source 31.

Examples of suitable data sources 31 include, without being limited to, radio receivers, oscilloscopes, oscilloscope probes, data-loggers, voltage sensors, current sensors, optical sensors, vibration sensors, accelerometers, pH sensors, flow-meters for a fluid (gas or liquid), seismometers, or any other type of test or measurement sensor. Further examples of suitable data sources 32 include cameras capturing still images and/or video data, microphones for capturing audio data, and so forth. All of the data sources 31 may be of the same type, or the apparatus 32 may be connected to a variety of different types of data sources 31.

The time series of data is stored to one or more storage devices 35 without interrupting reception of the time series of data (step S2). In some examples the process of storing the latest sample (or block/buffer of samples) from the time series of data may be conducted in parallel with receiving or obtaining the next sample (or block/buffer of samples). In some examples, the storage of the latest sample may be sufficiently fast that storage may be completed before the next sample is received or obtained.

Whilst the process continues (step S3|Yes), the apparatus 32 continues to receive or obtain the time series of data (step S1) and store the time series to one or more data storage devices 35 (step S2).

In parallel with the storage (step S2) of the time series of data, the processors 34 of the apparatus 32 executing the method also save the time series of data to a buffer stored in the corresponding volatile memory 37. The buffer has a length corresponding a base time period $T_{base}$, and more than one buffer may be maintained.

For example, if a sample of the time series of data at time t is denoted S(t), and if the sampling times are separated by a sampling interval $\delta t$, then any time from the start time $t_{start}$ of the time series of data may be denoted as $t_k=t_{start}+k.\delta t$ with k an integer corresponding to the most recent sampling, and with $0 \le k$. For brevity, let $S(t_k)=S_k$ for the $k^{th}$ sample of the time series of data. Samples $S_k$ may be added to a buffer B for the duration of a base time period $T_{base}$, i.e. the buffer has a length of KB samples where $KB.\delta t=T_{base}$, so that for example when filled $B=\{S_{k-KB+1}, S_{k-1}, S_k\}$. A single sampling $S_k$ of the time series of data may corresponding to a single value (real or complex), an array, vector or matrix of real of complex values, an image, a frame of video, and so forth, depending on the type of data source 31.

Once the most recent sample $S_k$ is saved to a buffer B, it is checked whether the current base time period $T_{base}$ has elapsed (step S5). Equivalently, the number of samples stored in the buffer B could be checked. Let the end of the current base time period be denoted as $T_n$ and the end of the first time period as $T_1$, so that $T_n = n.KB$ with $n>0$, and $T_n - T_{n-1} = T_{base}$.

If the process is part-way through the current base time period $T_{base}$ (step S5|No), then the next sample $S_{k+1}$ is received or obtained (step S1). For example, the process is part-way through the current base time period if $(n-1).KB < k < n.KB$.

At the end of the most recently elapsed base time period $T_n$ (step S5|Yes), and without interrupting the processes of receiving/obtaining (step S1) and storing (step S2) the time series of data $S_k$, summary measurements are calculated and the binary tree structure is updated (steps S6 through S11). For example, the end of the most recently elapsed base time period is reached when $k = n.KB$.

The processor(s) 34 may maintain two (or more) buffers B1, B2. At the end of the most recently elapsed base time period ($k = n.KB$), if a first buffer B1 is filled, the processor(s) 34 may conduct analysis and binary tree structure updating on the contents of the first buffer B1 whilst filling a second buffer B2 with newly received/obtained samples $S_k$. Depending on the data rate of the time series of data $S_k$ and the speed of the processor(s) 34, the number of buffers B needed to avoid interruption to the processes of receiving/obtaining (step S1) and storing (step S2) the time series of data $S_k$ could be more than two. In some examples, the number of buffers may be dynamically increased or decreased as required. For example, the amount of processing may vary depending on both the contents of the time series $S_k$ in the most recently elapsed base time period $T_n$ and the number n of that period (as explained hereinafter, a greater number of binary tree nodes will be generated each time that n is equal to or divisible by a power of 2).

At the end of the most recently elapsed base time period $T_n$ (step S5|Yes), one or more summary measurements are calculated based on the time series of data corresponding to the most recently elapsed base time period $T_n$ (step S6). For example, the buffer $B = \{S_{k-KB+1}, \ldots, S_{k-1}, S_k\}$ may be processed to calculate a number m of measurements forming a set of measurements $\{G^1_n, G^2_n, \ldots, G^i_n, \ldots, G^m_n\}$ corresponding to the $n^{th}$ base time period $T_n$, with i an integer $1 \leq i \leq m$. The measurements $G^i_n$ may be regarded as summary data/measurements for the most recently elapsed base time period $T_n$. Once generated, the measurements $G^i_n$ for the most recently elapsed base time period $T_n$ are stored to one or more data storage devices 35.

Examples of measurements $G^i_n$ may include, without being limited to, a mean, a median, a mode, a standard deviation, a variance, a frequency spectrum, a power frequency spectrum, a minimum, a maximum, one or more percentile values, a histogram, parameters of a model fitted against the time series of data $S_k$ during the base time period $T_n$, a heat-map, and so forth. There is no practical limit on the type or nature of measurements $G^i_n$ except that they should be calculable without interrupting concurrent processes of the method (e.g. reception and storage of further samples $S_k$). The one or more measurements $G^i_n$ may include time resolved frequency information obtained, for example, based on Fast Fourier Transform (FFT) overlap processing applied to the time series of data $S_k$ corresponding to the most recently elapsed base time period $T_n$.

A binary tree structure indexing the time series of data $S_k$ and the corresponding summary measurements $G^i_n$ is updated (steps S7 through S11).

Let a node of the binary tree structure be denoted generally as node(h,j) with h denoting a height of that node $h \geq 0$, and $j \geq 1$ denoting the numbering of that node within a level (same height, h value). In this notation, a binary tree leaf may be denoted node(0,j). Each binary tree node (branch nodes or root node) node($h \geq 1$,j) may be connected to descendant binary tree nodes (branch nodes) node($h \geq 1$,j) or to binary tree leaves node(0,j) using internal pointers (not shown). Alternatively, internal pointers need not be used because the time period corresponding to each binary tree leaf node(0,j) is fixed at $T_{base}$, giving the binary tree structure a predictable structure at each level/height h. Consequently, each binary tree node (branch nodes or root node) node($h \geq 1$,j) may simply list the indices, j, of the descendant binary tree nodes (branch nodes) node($h \geq i$,j) or binary tree leaves node(0,j). It may be noted that for a height $h \geq 1$ binary tree node node($h \geq 1$,j) the descendants may be presumed to have height h−1.

A new binary tree leaf corresponding to the most recently elapsed base time period $T_{base}$ is generated (step S7). For example, at the end of the time period $T_n$ the binary tree leaf node(0,n) is generated. The $n^{th}$ binary tree leaf node(0,n) includes one or more external pointers (external to the tree structure) which point to the one or more measurements $G^i_n$ corresponding to that base time period $T_n$. Each binary tree leaf node(0,n) is read-only once generated, i.e. the binary tree leaves node(0,j) (for are not updated or modified subsequently. The corresponding measurements $G^i_n$ are also read-only once calculated, and do not require updating or re-calculation as the binary tree structure grows.

Each binary tree leaf node(0,j) may also include a raw data pointer pointing to the samples $\{S_{(j-1)KB+1}, \ldots, S_{jKB-1}, S_{jKB}\}$ corresponding to the respective base time period $T_j$ as stored on one or more data storage devices 35. In some examples, the raw data pointer may point to a file on a data storage device 35 which corresponds exactly to the data samples $\{S_{(j-1)KB+1}, \ldots, S_{jKB-1}, S_{jKB}\}$ of the respective base time period $T_j$. Alternatively, when the time series of data $S_k$ is saved to files on a data storage device 35 which correspond to (or even span) multiple base time periods $T_j$, then the raw data pointer may point to a position (e.g. a HDD or SSD address) within a file at which the data samples $\{S_{(j-1)KB+1}, \ldots, S_{jKB-1}, S_{jKB}\}$ corresponding to the respective base time period $T_j$ commence.

After generating the new binary tree leaf node(0,n) (step S7), starting from height h=1 (step S8), it is checked whether one or more binary tree nodes node($h \geq 1$,j) could be added to complete a perfect binary sub-tree structure including the new binary tree leaf node(0,n) (step S9). If one or more binary tree nodes node($h \geq 1$,j) could be added, then these new binary tree nodes node($h \geq 1$,j) are generated (step S10). The process is repeated (step S9) after incrementing the height $h \to h+1$ (step S11) until no further new nodes node (h,j) can be added to complete a perfect binary sub-tree structure (step S9|No).

Each binary tree node node($h \geq 1$,j) generated whilst receiving/obtaining the time series of data (steps S8 through S11) has exactly two descendant lower level binary tree nodes node($h \geq 1$,j) (for $h \geq 2$) or binary tree leaves node(0,j) (for h=1). For example each generated binary tree node node($h \geq 1$,j) may include exactly two internal pointers to lower level binary tree nodes node($h \geq 1$,j) (for $h \geq 2$) or binary tree leaves node(0,j) (for h=1), or may list exactly two index values j corresponding to the level with height h−1. Each binary tree node node(h≥1,j) also includes a time index value τ corresponding to the time separating the pair of nodes node(h−1,j) or leaves node(0,n) which descend from that new binary tree node node(h,j). For example, a height h=1 node node(1,j) pointing to the pair of leaves node(0,j) and node(0,j+1) would store a time index value τ=$T_j$. When searching the binary tree structure for a time t, if t≤τ=$T_j$, then the leaf node(0,j) is selected, and otherwise the leaf node (0,j+1) is selected. The process is similar for heights h>1.

Each binary tree node node(h≥1,j) also includes one or more external pointers to one or more aggregated measurements $\{H^1_{h,j}, H^2_{h,j}, \ldots, H^i_{h,j}, \ldots, H^{ma}_j\}$, with $H^i_{h,j}$ denoting the $i^{th}$ of a number ma aggregated measurements for the $j^{th}$ node at height h. Each binary tree node node(h≥1,j) is read-only once generated, i.e. the binary tree nodes node (h≥1,j) are not updated or modified subsequently. The corresponding aggregated measurements $H^i_{h,j}$ are also read-only once calculated.

Each aggregated measurement $H^i_{h,j}$ is based on all base time periods $T_{base}$ descendant from the corresponding binary tree node node(h≥1,j). The number ma and type of aggregated measurements $H^i_{h,j}$ may be identical to the number m and type of measurements $G^i_j$ calculated for each binary tree leaf node(0,j). Alternatively, the number ma and type of aggregated measurements $H^i_{h,j}$ may be different to the number m and type of measurements $G^i_j$ calculated for each binary tree leaf node(0,j). For example, there may be fewer aggregated measurements ma<m. Generating a new binary tree node node(h≥1,j) (step S10) includes generating the corresponding aggregated measurements $H^i_{h,j}$. Preferably, the aggregated measurements $H^i_{h,j}$ may be calculated using the measurements $G^i_j$ or the aggregated measurements $H^i_{h,j}$ corresponding to the pair of nodes node(h−1,j) or leaves node(0,n) which descend from the new binary tree node node(h,j). For example, an aggregated measurement $H^i_{h,j}$ corresponding to a histogram or a heat-map may be generated for a height h by simply summing a pair of histograms/heat-maps corresponding to the pair of nodes node(h−1,j) or leaves node(0,n) which descend from the new binary tree node node(h,j). However, some types of aggregated measurements $H^i_{h,j}$ may require calculations based on the actual samples $S_k$ making up the time series of data. Since binary tree nodes node(h≥1,j) at a height h will generated at a rate which halves with each increase in height h, when calculations of an aggregated measurements $H^i_{h,j}$ need to be based on the samples $S_k$, calculation based on large volumes of samples $S_k$ will only be needed at widely space intervals. If such calculations take longer than a base time period $T_{base}$, then they may be conducted as a background process without interrupting the recording (steps S1, S2) of the time series of data or the updating (steps S4 through S11) of samples $S_k$ from subsequent base time periods $T_{base}$.

The new binary tree leaf node(0,n) and any new binary tree nodes node(h≥1,j) may be disjoint from other, previously generated binary tree leaves node(0,j) and nodes node(h≥1,j). A perfect binary sub-tree structure only includes binary tree nodes node(h≥1,j) with a degree of two, and all of the binary tree leaves node(0,j) are at the same level. The condition for the binary tree leaves node(0,j) is always true for the methods of this specification as a result of generating (step S7) the leaves node(0,j) at height h=0.

An alternative description of generating new binary tree nodes node(h≥1,j) (steps S8 through S11) is that after generating the new binary tree leaf node(0,n), an integer p is determined which corresponds to the largest positive integer for which n is equal to, or divisible by, two to the power of p, $2^p$. If p is greater than zero, then a perfect binary sub-tree structure is possible which connects each binary tree leaf node(0,j) between and including the $(n−2^p+1)$th to $n^{th}$ binary tree leaves, i.e. node(0,n−$2^p$+1) to node(0,n). The binary tree nodes node(h≥1,j) necessary to complete such a perfect binary sub-tree structure are then generated, along with the corresponding aggregated measurements $H^i_{h,j}$.

Figure 3A:
FIGS. 3A to 3N illustrate worked examples of updating a binary tree structure for indexing a time series of data.
Figure 3B:
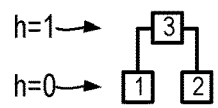
Figure 3C:
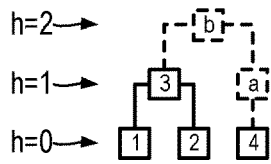
Figure 3D:
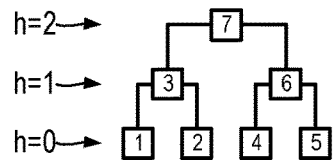
Figure 3E:
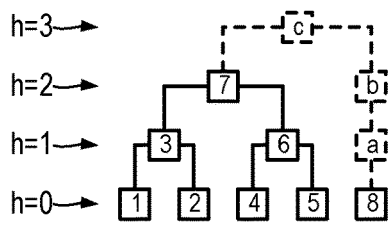
Figure 3F:
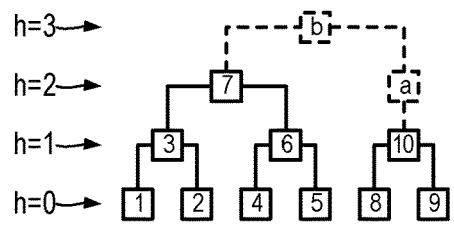
Figure 3G:
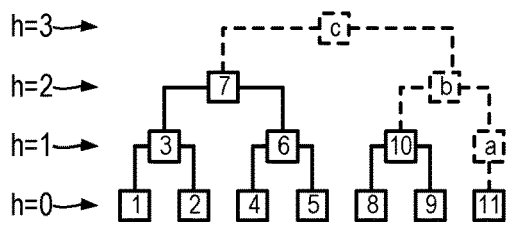
Figure 3H:
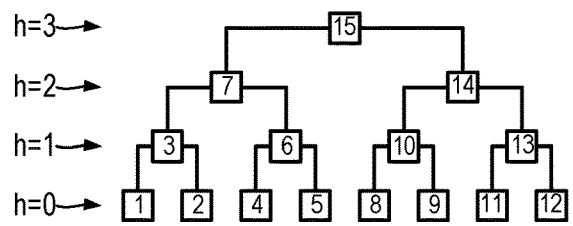
Figure 3I:
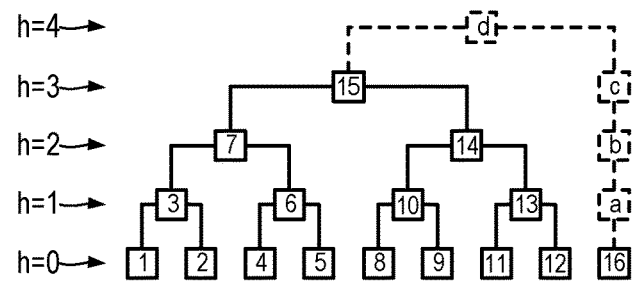
Figure 3J:
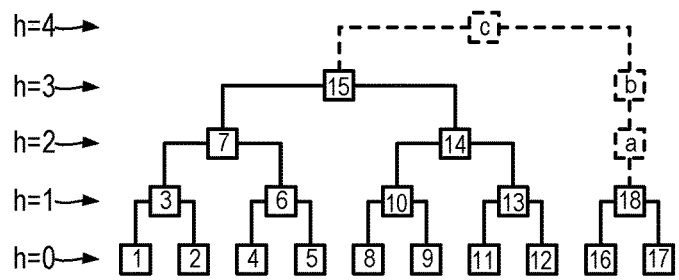
Figure 3K:
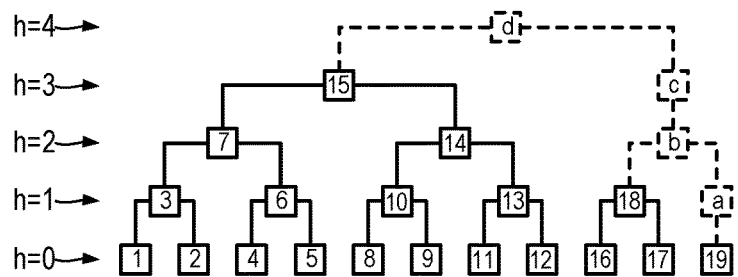
Figure 3L:
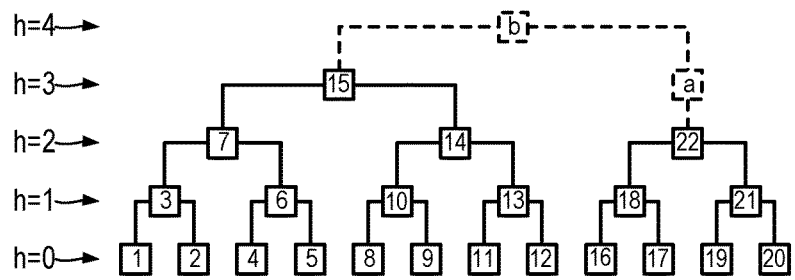
Figure 3M:
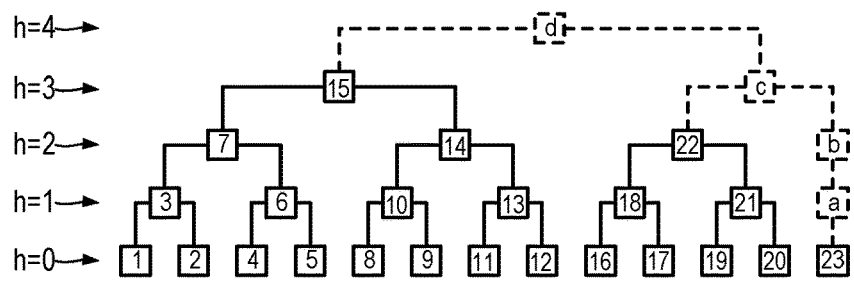
Figure 3N:
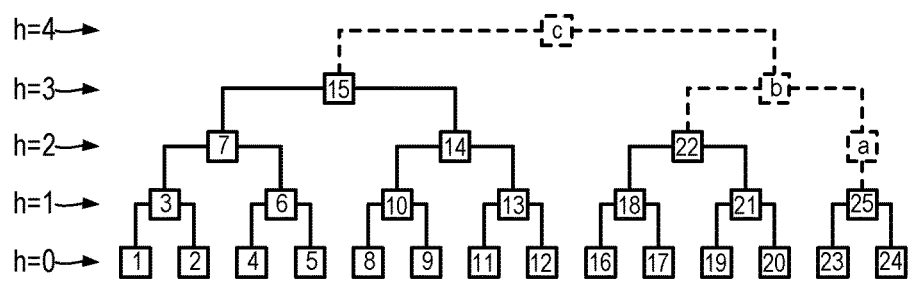

Referring also to FIGS. 3A to 3N, the updating of the binary tree structure according to the methods of the present specification is illustrated from $1^{st}$ (n=1) to $14^{th}$ (n=14) base time periods $T_{base}$. Nodes and edges shown with dashed lines shall be explained hereinafter (in relation to steps S12, S13 and S14).

Referring in particular to FIG. 3A, at the end of the first base time period $T_1$, n=1, the first binary tree leaf node(0,1) is generated, denoted by reference numeral 1 and pointing to corresponding measurements $G^i_1$. The binary tree leaf node (0,1) may also point to the samples $S_k$ corresponding to the first base time period $T_1$.

A height h=1 node could only have degree of one, and therefore no height h=1 binary tree node node(h≥1,i,j) is generated (step S9|No). Equivalently, the largest value of p for which n=1 is equal to or divisible by $2^p$ is p=0 ($2^0$=1), so no binary tree nodes node(h≥1,j) are generated.

Referring in particular to FIG. 3B, at the end of a second base time period $T_2$, n=2, the second binary tree leaf node(0,2) is generated, denoted by reference numeral 2 and pointing to corresponding measurements $G^i_2$. The binary tree leaf node(0,2) may also point to the samples $S_k$ corresponding to the second base time period $T_2$.

A height h=1 node with a degree of two is possible (step S9|Yes), so a new binary tree node node(1,1) is generated (step S10), denoted by reference numeral 3 and having a time index value τ=$T_1$ and internal pointers or index j listings connecting to the binary tree leaves node(0,1) and node(0,2). Corresponding aggregated measurements $H^i_{1,1}$ are also generated and a pointer to the aggregated measurements $H^i_{1,1}$ is included in the new binary tree node node(1,1). A height h=2 (step S11) node with a degree of two is not possible (step S9|No), so updating the binary tree structure is completed till the end $T_3$ of the next base time period $T_{base}$.

Equivalently, the largest value of p for which n=2 is equal to or divisible by $2^p$ is p=1 ($2^1$=2), and the binary tree node node(1,1) is required to be generated to complete a perfect binary sub-tree connecting the binary tree leaves node(0,1) to node(0,2).

Referring in particular to FIG. 3C, at the end of the third base time period $T_3$, n=3, the third binary tree leaf node(0,3) is generated, denoted by reference numeral 4 and pointing to corresponding measurements $G^i_3$. The binary tree leaf node (0,3) may also point to the samples $S_k$ corresponding to the third base time period $T_3$.

A new height h=1 node could only have degree of one, and therefore no new height h=1 binary tree node node(h≥1, j) is generated (step S9|No). Equivalently, the largest value of p for which n=3 is equal to or divisible by $2^p$ is p=0 ($2^0$=1) so no new binary tree nodes node(h≥1,j) are generated.

Therefore, after the first three base time periods, the binary tree structure includes a perfect binary sub-tree of height h=1, (including node(1,1), node(0,1) and node(0,2)), and a disjoint binary tree leaf node(0,3).

Referring in particular to FIG. 3D, at the end of a fourth base time period $T_4$, n=4 the fourth binary tree leaf node(0,4) is generated, denoted by reference numeral 5 and pointing to corresponding measurements $G^i_4$. The binary tree leaf node (0,4) may also point to the samples $S_k$ corresponding to the fourth base time period $T_4$.

A new height h=1 node with a degree of two is possible (step S9|Yes), so a new binary tree node node(1,2) is generated (step S10), denoted by reference numeral 6 and having a time index value τ=T$_3$ and internal pointers or index j listings connecting to the binary tree leaves node(0,3) and node(0,4). Corresponding aggregated measurements H$^i_{1,2}$ are also generated and a pointer to the aggregated measurements H$^i_{1,2}$ is included in the new binary tree node node(1,2).

A height h=2 (step S11) node with a degree of two is possible (step S9|Yes), so a new binary tree node node(2,1) of height h=2 is generated (step S10), denoted by reference numeral 7 and having a time index value τ=T$_2$ and internal pointers or index j listings connecting to the height h=i binary tree nodes node(1,1) and node(1,2). Corresponding aggregated measurements H$^i_2$ are also generated and a pointer to the aggregated measurements H$^i_{2,1}$ is included in the new binary tree node node(2,1). A height h=3 (step S11) node with a degree of two is not possible (step S9|No), so updating the binary tree structure is completed till the end T$_5$ of the next base time period T$_{base}$.

Equivalently, the largest value of p for which n=4 is equal to or divisible by $2^p$ is p=2 ($2^2$=4). In order to complete a perfect binary sub-tree of height p=h=2 which connects the n−$2^p$+1=4−$2^2$+1=1$^{st}$ binary tree leaf node(0,1) to the 4$^{th}$ binary tree leaf node(0,4), two binary tree nodes are required to be generated, namely node(1,2) and node(2,1) and the corresponding aggregate measurements H$^i_{1,2}$ and H$^i_{2,1}$ must also be calculated.

Therefore, after the first four base time periods, the binary tree structure includes a single perfect binary tree of height h=2, with no disjoint portions. The binary tree structure will be a single, perfect binary tree whenever n is equal to a power of two. In other words, when n=$2^p$ for positive integer p, the binary tree structure has the form of a single, perfect binary tree of height p. In general, when a time series of data is finished or when recording of the time series of data is stopped (for example because a pre-set time has elapsed or in response to a user input), it is unlikely that the binary tree structure will be a single, perfect binary tree, and it is more likely to include two or more disjoint binary trees (alternatively may be referred to as two or more disjoint binary sub-trees). Procedures for handling this when recording of the time series of data ends are described hereinafter (step S12).

Referring in particular to FIG. 3E, at the end of the fifth base time period T$_5$, n=5 the fifth binary tree leaf node(0,5) is generated, denoted by reference numeral 8 and pointing to corresponding measurements G$^i_5$. The binary tree leaf node (0,5) may also point to the samples S$_k$ corresponding to the fifth base time period T$_5$.

A new height h=1 node could only have degree of one, and therefore no new height h=1 binary tree node node(h≥1, j) is generated (step S9|No). Equivalently, the largest value of p for which n=5 is equal to or divisible by $2^p$ is p=0 ($2^0$=1) so no new binary tree nodes node(h≥1,j) are generated.

Therefore, after the first five base time periods, the binary tree structure includes a perfect binary sub-tree of height h=2, namely node(2,1) denoted by reference numeral 7 and the descendant nodes (reference numerals 1 through 6), and a disjoint binary tree leaf node(0,5) denoted by reference numeral 8.

In the interests of brevity, the remaining steps of the worked example shown in FIGS. 3A to 3N shall be described in less detail, though the underlying methods are identical to those outlined hereinbefore.

Referring in particular to FIG. 3F, at the end of the sixth base time period T$_6$, n=6 the sixth binary tree leaf node(0,6) is generated, denoted by reference numeral 9. The height h=1 binary tree node node(1,3), denoted by reference numeral 10, is also generated to connect the binary tree leaves node(0,5) and node(0,6). After the end of the sixth base time period T$_6$, the overall binary tree structure includes two disjoint portions.

Referring in particular to FIG. 3G, at the end of the seventh base time period T$_7$, n=7 the seventh binary tree leaf node(0,7) is generated, denoted by reference numeral 11.

No binary tree nodes node(h≥1,j) are generated. After the end of the seventh base time period T$_7$, the overall binary tree structure includes three disjoint portions.

Referring in particular to FIG. 3H, at the end of the eighth base time period T$_8$, n=8 the eighth binary tree leaf node (0,8) is generated, denoted by reference numeral 12. The height h=1 binary tree node node(1,4), denoted by reference numeral 13, is generated to connect the binary tree leaves node(0,7) and node(0,8). The height h=2 binary tree node node(2,2), denoted by reference numeral 14, is generated to connect the binary tree nodes node(1,3) and node(1,4). Finally, the height h=3 binary tree node node(3,1), denoted by reference numeral 15, is generated to connect the binary tree nodes node(2,1) and node(2,2). After the end of the eighth base time period T$_8$, the overall binary tree structure is a single binary tree having no disjoint portions (n=8=$2^3$).

Referring in particular to FIG. 3I, at the end of the ninth base time period T$_9$, n=9 the ninth binary tree leaf node(0,9) is generated, denoted by reference numeral 16. No binary tree nodes node(h≥1,j) are generated. After the end of the ninth base time period T$_9$, the overall binary tree structure includes two disjoint portions.

Referring in particular to FIG. 3J, at the end of the tenth base time period T$_{10}$, n=10 the tenth binary tree leaf node (0,10) is generated, denoted by reference numeral 17. The height h=1 binary tree node node(1,5), denoted by reference numeral 18, is generated to connect the binary tree leaves node(0,9) and node(0,10). After the end of the tenth base time period T$_{10}$, the overall binary tree structure includes two disjoint portions.

Referring in particular to FIG. 3K, at the end of the eleventh base time period T$_{11}$, n=11 the eleventh binary tree leaf node(0,11) is generated, denoted by reference numeral 19. No binary tree nodes node(h≥1,j) are generated. After the end of the eleventh base time period T$_{11}$, the overall binary tree structure includes three disjoint portions.

Referring in particular to FIG. 3L, at the end of the twelfth base time period T$_{12}$, n=12 the twelfth binary tree leaf node(0,12) is generated, denoted by reference numeral 20. The height h=1 binary tree node node(1,6), denoted by reference numeral 21, is generated to connect the binary tree leaves node(0,11) and node(0,12). The height h=2 binary tree node node(2,3), denoted by reference numeral 22, is generated to connect the binary tree nodes node(1,5) and node(1,6). After the end of the twelfth base time period T$_{12}$, the overall binary tree structure includes two disjoint portions.

Referring in particular to FIG. 3M, at the end of the thirteenth base time period T$_{13}$, n=13 the thirteenth binary tree leaf node(0,13) is generated, denoted by reference numeral 23. No binary tree nodes node(h≥1,j) are generated. After the end of the thirteenth base time period T$_{13}$, the overall binary tree structure includes three disjoint portions.

Referring in particular to FIG. 3N, at the end of the fourteenth base time period T$_{14}$, n=14 the fourteenth binary tree leaf node(0,14) is generated, denoted by reference numeral 24. The height h=1 binary tree node node(1,7), denoted by reference numeral 25, is generated to connect the binary tree leaves node(0,13) and node(0,14). After the end of the fourteenth base time period $T_{14}$, the overall binary tree structure includes three disjoint portions.

This process may be extended for as long as the time series of data continues to be received/obtained (step S1) and stored (step S2). In this way, the binary tree leaves node(0,j) and nodes node(h≥1,j) are generated essentially in real time and concurrently with receiving/obtaining the time series of data $S_k$. The corresponding summary measurements $G^i_j$ and $H^i_{h,j}$ are also generated essentially in real time. Consequently, when the time series of data $S_k$ finishes or when receiving/obtaining the time series of data $S_k$ is stopped, an index in the form of the binary tree structure may be completed ready for a user to browse and analyse with only a relatively small amount of final processing (compared to indexing the data in a block after the end of recording the data $S_k$).

Referring again to FIG. 2, when the reception/obtaining of the time series of data $S_k$ finishes (step S3|No), the binary tree structure is completed (step S12) in order to connect any and all disjoint portions of the binary tree structure to a single binary tree root node node($h_{max,1}$), with $h_{max}$ denoting the maximum height h (overall height of the completed binary tree structure). For example, receiving/obtaining the time series of data $S_k$ may finish (step S3|No) because the time series of data has a finite length, because a pre-set duration of recording has elapsed, or in response to receiving user input via a local or remote client 39, 40.

Completing the binary tree (step S12) involves generating any binary tree completion nodes node(h≥1,j) which are needed to connect all portions of the binary tree structure to a single root node. The main difference between completing the binary tree structure (step S12) and preceding steps of the method is that binary tree completion nodes node(h≥1,j) generated during final processing (step S12) are permitted to have a degree of one. Consequently, the completed binary structure may be imperfect due to including nodes node (h≥1,j) having a degree of one.

Referring in particular to FIG. 3C, an example is shown of binary tree completion nodes node(h≥1,j) which would be generated if receiving/obtaining the time series of data $S_k$ was stopped at the end of the third base time period $T_3$. In FIGS. 3A to 3N, binary tree nodes node(h≥1,j) and edges added to complete the binary tree structure (during step S12) are shown using dashed lines and using reference numerals "a" through "d".

FIG. 3C illustrates two disjoint portions. In order to complete the binary tree structure (step S12), a height h=1 binary tree completion node node(1,2) is generated, denoted by reference numeral "a", and from which only the third binary tree leaf node(0,3) denoted by reference numeral 4 descends. A height h=2 binary tree completion node node (2,1) is also generated, denoted by reference numeral "b", and from which the binary tree node node(1,1) and the binary tree completion node node(1,2) descend. The binary tree completion node node(2,1) provides a single root node for the binary tree structure, i.e. $h_{max}$=2. Binary tree completion nodes node(h≥1,j) are identical to binary tree nodes node(h≥1,j) described hereinbefore, except that binary tree completion nodes node(h≥1,j) may have a degree (number of exiting edges) equal to one or two. In particular, binary tree completion nodes node(h≥1,j) correspond to the same number and type of aggregated measurements $H_{i,h,j}$ as binary tree nodes node(h≥1,j) generated (steps S8 through S11) whilst receiving/obtaining and storing the time series of data $S_k$.

Referring in particular to FIG. 3E, after the fifth base time period $T_5$ there are two disjoint portions of the binary tree structure. In order to complete the binary tree structure (step S12), a height h=1 binary tree completion node node(1,3) is generated, denoted by reference numeral "a", and from which only the fifth binary tree leaf node(0,5) denoted by reference numeral 8 descends. A height h=2 binary tree completion node node(2,2) is also generated, denoted by reference numeral "b", and from which only the binary tree completion node node(1,3) descends. Finally, a height h=3 binary tree completion node node(3,1) is generated, denoted by reference numeral "c", and from which the binary tree node node(3,1) and the binary tree completion node node (2,2) descend.

Further examples of generating binary tree completion nodes node(h≥1,q) (step S12) are shown in FIGS. 3F, 3G, and 3I through 3N, see the dashed lines and nodes labelled using reference numerals "a" through "d". The precise number of binary tree completion nodes node(h≥1,q) which need to be generated to complete the final (typically imperfect) binary tree index structure will depend on the overall length of the recorded time series of data $S_k$, though the number scales relatively slowly for recordings of even very long duration—roughly one extra binary tree completion node node(h≥1,q) is needed every time the total duration doubles. For example, for a number n of base time periods $T_{base}$, if the largest integer q for which $2^q<n$ is found, then the maximum number of number of binary tree completion nodes node(h≥1,q) which need to be generated will be q+1.

As an illustrative example, if the base time period is $T_{base}$=1 second, then after 1 day of recording (86,400 base time periods $T_{base}$), q=16 ($2^{16}$=65,536 base time periods $T_{base}$) so that at most 17 binary tree completion nodes node(h≥1,q) and corresponding aggregated measurements $H^i_{h,j}$ would need to be generated at the end of recording. Such processing is insignificant compared to the size of the existing binary tree structure at that time, meaning that a user can begin navigating and/or zooming into the dataset and viewing the summary measurements $G^i_j$, $H^i_{h,j}$ at each level almost immediately after the recording of the time series of data $S_k$ has been stopped/finished. To illustrate the excellent scaling of the present method, the number of binary tree completion nodes node(h≥1,q) and corresponding aggregated measurements $H^i_{h,j}$ which need to be generated at the end of recording would not increase to 18 until the total duration exceeds n>$2^{17}$, after roughly 36 hours and 24 minutes.

The present method enables generation and indexing of summary measurements $G^i_j$, $H^i_{h,j}$ for the time series of data $S_k$ in real time (or as close to real time as is possible in practice). This allows a user to begin reviewing and analysing the time series of data almost immediately after recording of the time series of data $S_k$ stops or is stopped.

If receiving/obtaining the time series of data $S_k$ stops or is stopped partway through a base time period $T_{base}$, then the processing described hereinbefore may be applied to a final time period which is shorter than all the preceding time periods (i.e. less than $T_{base}$). In some examples, when a user provides a command to stop receiving/obtaining the time series of data $S_k$, the apparatus 32 may continue to the end of the pending base time period $T_n$, though this may depend on the length of the base time period $T_{base}$.

The method may be applied to two or more time series of data received/obtained in parallel by the apparatus 32. For example, a separate processor 34, volatile memory 37 and data storage device 35 may process each time series of data.

Once the binary tree index structure is complete, including all the corresponding calculated summary measurements $G^i_j$, a user may enter a query specifying a query time period $Q_T$ using a local or remote client 39, 40. Alternatively, an analysis program (not shown) executing on the local or remote client 39, 40 may automatically generate one or more user queries, for example using an API. The completed binary tree structure may be searched using conventional methods for searching binary tree indices, and the summary measurements $G^i_j$, $H^i_{h,j}$ corresponding to query time period $Q_T$ may be retrieved and presented to the user by the display 42 of the local or remote client 39, 40. Display of summary measurements $G^i_j$, $H^i_{h,j}$ may be omitted when a user query has been automatically generated. Additional features relating to comparing the query time period $Q_T$ against a threshold Thresh shall be described hereinafter in relation to processing of live queries, but are equally applicable to queries processed after completing (step S12) the binary tree structure to form a single binary tree.

Processing User Queries During Recording of the Time Series of Data

An advantage of the methods of the present specification is that the binary tree nodes and leaves node(h,j) are read-only once generated, as are the corresponding summary measurements $G^i_j$, $H^i_{h,j}$. Consequently, binary tree nodes and leaves node(h,j) and the corresponding summary measurements $G^i_{h,j}$ may be accessed without disrupting the process of receiving/obtaining (step S1), storing (step S2) and processing (steps S4 though S11) further samples $S_k$ of the time series of data.

Referring again to FIG. 2, a user query may be received whilst the time series of data $S_k$ is being received/obtained (step S13). For example, a user query may be entered using a graphical user interface (GUI) executed on a local or remote client 39, 40.

Additionally or alternatively, an analysis program (not shown) executed by a local or remote client 39, 40 may generate a user query using an API (not shown). The user query should include at least a query time period $T_Q$ for which it is require to retrieve information such as, for example, the corresponding summary measurements $H^i_{h,j}$, further query measurements, or even the stored samples $S_k$. When two or more data sources 31 are included in the system 30, a user query should also identify which data source(s) 31 should be queried.

For example, a GUI executed on a local or remote client 39, 40 may use the display 42 to present summary measurements $G^i_j$,$H^i_{h,j}$ to a user as they are generated, with a refresh rate depending for example on a zoom level of the GUI. The user may identify what appears to be a transient or anomaly in the time series of data $S_k$ based on the displayed summary measurements $G^i_j$, $H^i_{h,j}$, and may use the GUI to specify a query time period $T_Q$ encompassing the transient or anomaly which they wish to investigate.

In response to receiving a user query specifying a query time period $T_Q$ (S13|Yes), live analysis of the time series of data is performed (step S14). Live analysis (step S14) of the time series of data $S_k$ is performed in parallel with other ongoing processes, and does not interrupt receiving/obtaining (step S1), storing (S2) or processing (steps S4 through S11) the time series of data $S_k$.

Figure 4:
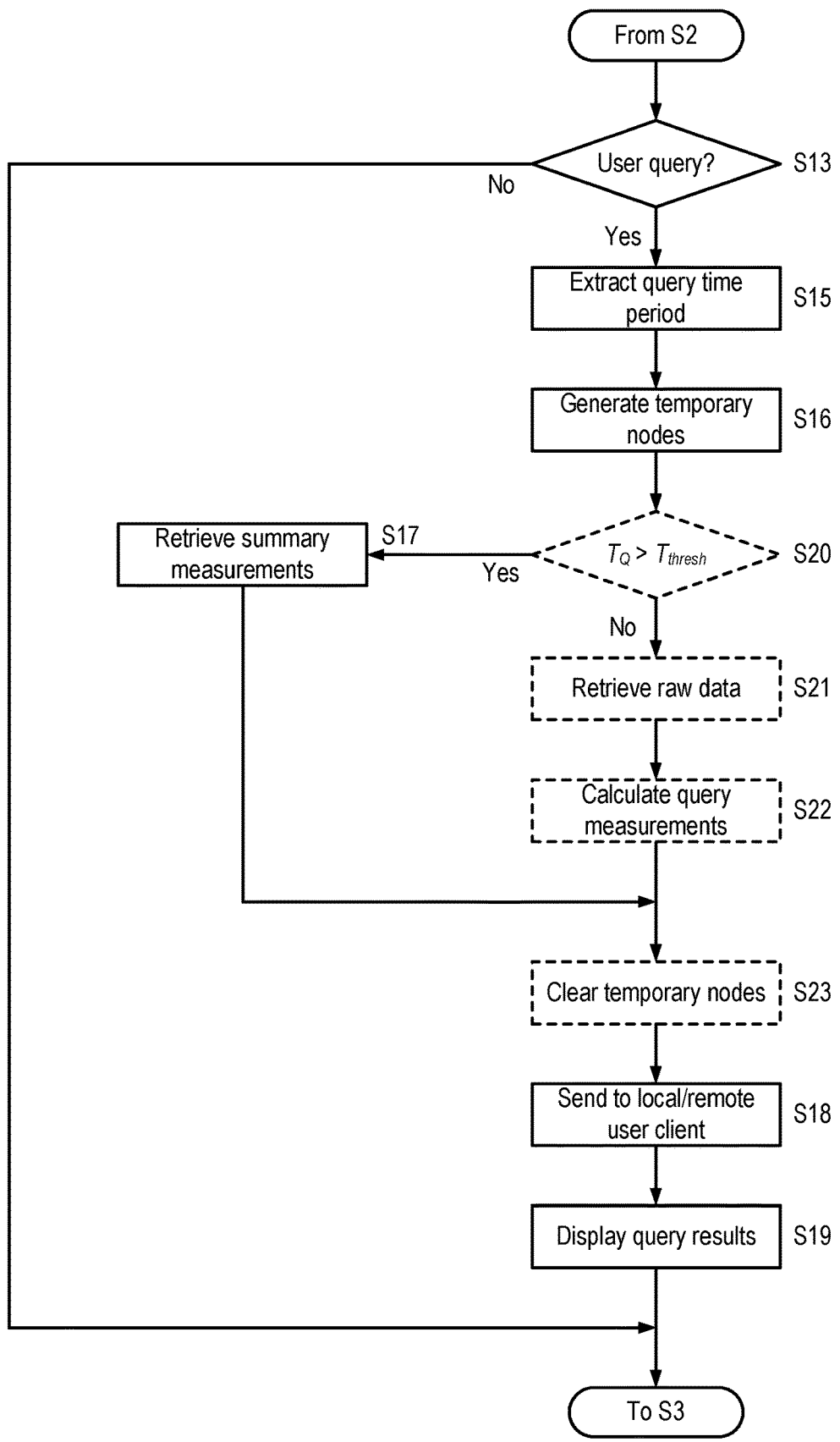
FIG. 4 is a process flow diagram for a method of querying a binary tree structure without interrupting the method shown in FIG. 2.

Referring also to FIG. 4, an example process for live analysis (step S14) of the time series of data $S_k$ is shown.

In response to receiving a user query (step S13|Yes), the query time period $T_Q$ is extracted from the user query (step S15).

Temporary nodes temp(h≥1,j) are generated to connect (or link) all existing portions of the binary tree structure to a single temporary binary tree root node temp($h_{max,1}$) (step S16).

The temporary nodes temp(h≥1,j) are generated in a similar way to binary tree completion nodes node(h≥1,j) described hereinbefore, based on the state of the binary tree structure at the time of receiving the user query. The difference between temporary nodes temp(h≥1,j) generated (step S16) in response to a user query and completion nodes node(h≥1,j) generated (step S12) in response to ending recording of the time series of data $S_k$ is that the temporary nodes temp(h≥1,j) do not form a part of the binary tree structure and may be updated and/or overwritten in response to every new user query to ensure that the most recently generated portions of the binary tree structure will be accessible to the user query. Each temporary node temp(h≥1, j) points to a corresponding set of aggregated measurements $H^i_{hj}$ which includes the same number ma and type as a permanent binary tree node node(h≥1,j). The aggregated measurements $H^i_{h,j}$ corresponding to a temporary node temp (h≥1,j) are calculated at the same time as that temporary node temp(h≥1,j).

Referring again to FIGS. 3E to 3G and 3I to 3N, the nodes and edges shown with dashed lines and labelled "a" through "d" having been described hereinbefore as binary tree completion nodes node(h≥1,j) generated in response to ending recording the time series of data $S_k$. However, the nodes and edges shown with dashed lines and labelled "a" through "d" in FIGS. 3E to 3G and 3I to 3N equally correspond to the temporary nodes temp(h≥1,j) which would be generated in response to receiving a user query at the corresponding times.

After temporary nodes temp(h≥1,j) have been generated (step S16), the temporary nodes temp(h≥1,j) and the connected portions of the binary tree structure descending from the temporary nodes temp(h≥1,j), i.e. binary tree nodes and leaves node(h,j), are used to retrieve summary measurements $G^i_j$, $H^i_{hjj}$ corresponding to the query time period $T_Q$ (step S17). Since the binary tree nodes and leaves node(h,j) are read-only once generated, the execution of a user query does not interrupt the processing of samples $S_k$ received during processing of the user query.

For example, the summary measurements $G^i_j$, $H^i_{h,j}$ which most closely correspond to the query time period $T_Q$ may be retrieved. The appropriate height h from which to retrieve summary measurements $G^i_j$, $H^i_{hjj}$ may be determined by comparing the query time period $T_Q$ against the base time period $T_{base}$. If $T_Q \approx 2 \cdot T_{base}$ then height h=1 may be appropriate, whereas if $T_Q \approx 17 \cdot T_{base}$ then height h=4 corresponding to 16. $T_{base}$ may be the best level from which to retrieve aggregated measurements $H^i_{h,j}$. In general, the precise method of executing the query to retrieve summary measurements $G^i_j$, $H^i_{jj}$ is not critical, and conventional methods for searching binary trees may be used. As explained hereinbefore, the present specification is primarily concerned with optimised methods for generating binary tree nodes and leaves node(h,j) and calculating summary measurements $G^i_j$, $H^i_{hjj}$ in effectively real time during the process of receiving/obtaining a time series of data $S_k$.

The retrieved summary measurements $G^i_{hjj}$, $H^i_{hjj}$ are sent to the local or remote client 39, 40 which initiated the user query (step S18) and presented on the corresponding display 42 (step S19).

Optionally, the information provided in response to a user query may be determined by a threshold query time $T_{thresh}$. Following extraction of the query time period $T_Q$ (step S15) and generation of the temporary nodes temp(h≥1,j) needed to run the query (step S16), the query time period $T_Q$ may be compared against the threshold query time $T_{thresh}$ (step S20).

When the user query concerns a query time period $T_Q$ which exceeds the threshold query time $T_{thresh}$ (step S20|Yes) summary measurements $G^i{}_{hjj}$ corresponding to the query time period $T_Q$ (step S17) may be retrieved and sent to the local or remote client 39, 40 which initiated the user query (step S18) for presentation on a corresponding display 42 (step S19). Presentation of the summary measurements $G^i{}_j$, $H^i{}_{hjj}$ may be omitted when the user query was automatically generated. For example, when the user query concerns a time period $T_Q$ which is relatively long compared to the base time period $T_{base}$ and/or sampling interval δt (in other words a "zoomed out" view), pre-calculated summary measurements $G^i{}_j$, $H^i{}_{hjj}$ are returned.

However, when the user query concerns a query time period $T_Q$ which does not exceed the threshold query time $T_{thresh}$ (step S20|No), the raw data samples $S_k$ corresponding to the query time period $T_Q$ are retrieved instead of summary measurements $G^i{}_j$, $H^i{}_{hjj}$ (step S21). In such an implementation, the binary tree leaves node(0,j) should each include a pointer to the location of the corresponding raw data samples $S_k$ of the time series of data on one or more data storage devices 35.

Using the retrieved raw data samples $S_k$, one or more query measurements are calculated based on the time series of data $S_k$ corresponding to the query time period $Q_T$ (step S22). The one or more query measurements may be the same as the one or more measurements $G^i{}_j$ and/or the one or more aggregated measurements $H^i{}_{hj}$. Additionally, the one or more query measurements may include measurements which are not calculated as part of the summary measurements $G^i{}_j$, $H^i{}_{hjj}$, and may calculate the same measurements using different parameters from the summary measurements $G^i{}_j$, $H^i{}_{hjj}$. For example, the summary measurements $G^i{}_j$, $H^i{}_{hjj}$ may include time resolved frequency information obtained using 50% overlap Fast Fourier Transform (FFT) processing with a fixed window width, whereas the amount of overlap and/or the window width for FFT overlap processing could be user specified for a query measurement to allow a user to adjust the precise parameters as they review the time series of data $S_k$. The user query may specify the number, type and/or parameters for calculating query measurements, for example based on selections made by a user via a GUI executed on a local or remote client 39, 40.

The calculated query measurements are sent the local or remote client 39, 40 which sent the query (step S18), and presented on the corresponding display 42 (step S19). Optionally, the data samples $S_k$ corresponding to the query time period $T_Q$ may also be sent to the client 39, 40 and displayed in addition to the calculated query measurements. Display of calculated query measurements may be omitted if the user query was automatically generated.

Optionally, the temporary nodes temp(h,j) may be deleted upon completion of a user query(step S23). Alternatively, the temporary nodes temp(h,j) may simply be overwritten each time a new user query is received.

The method of conducting live queries may be applied when receiving/obtaining two or more time series of data in parallel.

As noted hereinbefore, user queries submitted by a local or remote client 39, 40 after recording of a time series of data may be processed in substantially the same way as live queries, with the difference being that generation of temporary nodes temp(h≥1,j) (step S16) will be omitted because the binary tree structure will have already been completed (step S12).

An advantage of the system 30 and methods described hereinbefore is that only summary measurements $G^i{}_j$, $H^i{}_{hj}$ and/or query measurements need to be transmitted to a remote client 40. Transmission of large amounts of raw data samples $S_k$ from the data sources 31 to the remote client 40 or from the apparatus 32 to the remote client 40 is not necessary. This may reduce the bandwidth requirements for connections to remote clients 40.

Second System

Figure 5:
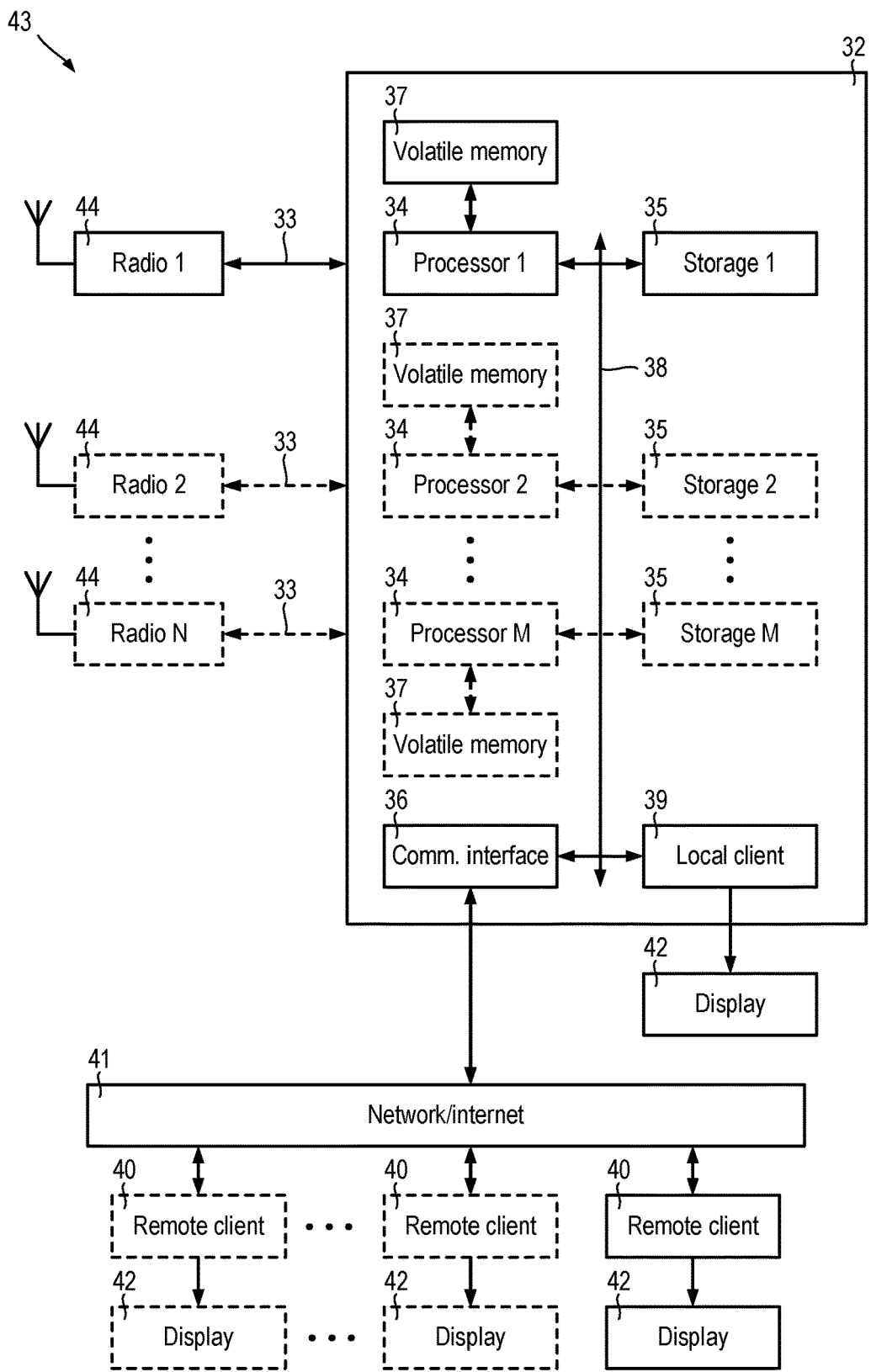
FIG. 5 illustrates a second system for processing radio frequency information received from, or obtained using, one or more radio receivers.

Referring also to FIG. 5, a second system 43 configured for receiving radio frequency signals is shown.

The second system 43 is the same as the system 30, except that each of the one or more data sources 31 takes the form of a radio receiver 44. The time series of data $S_k$ from each radio receiver 44 is in the form of In-phase and Quadrature (IQ) data. The apparatus 32 may control the tuning frequency of each radio receiver 44. For example, user input via a GUI executed by a local or remote client 39, 40 may specify a range of frequencies for the radio receivers 44.

Figure 6:
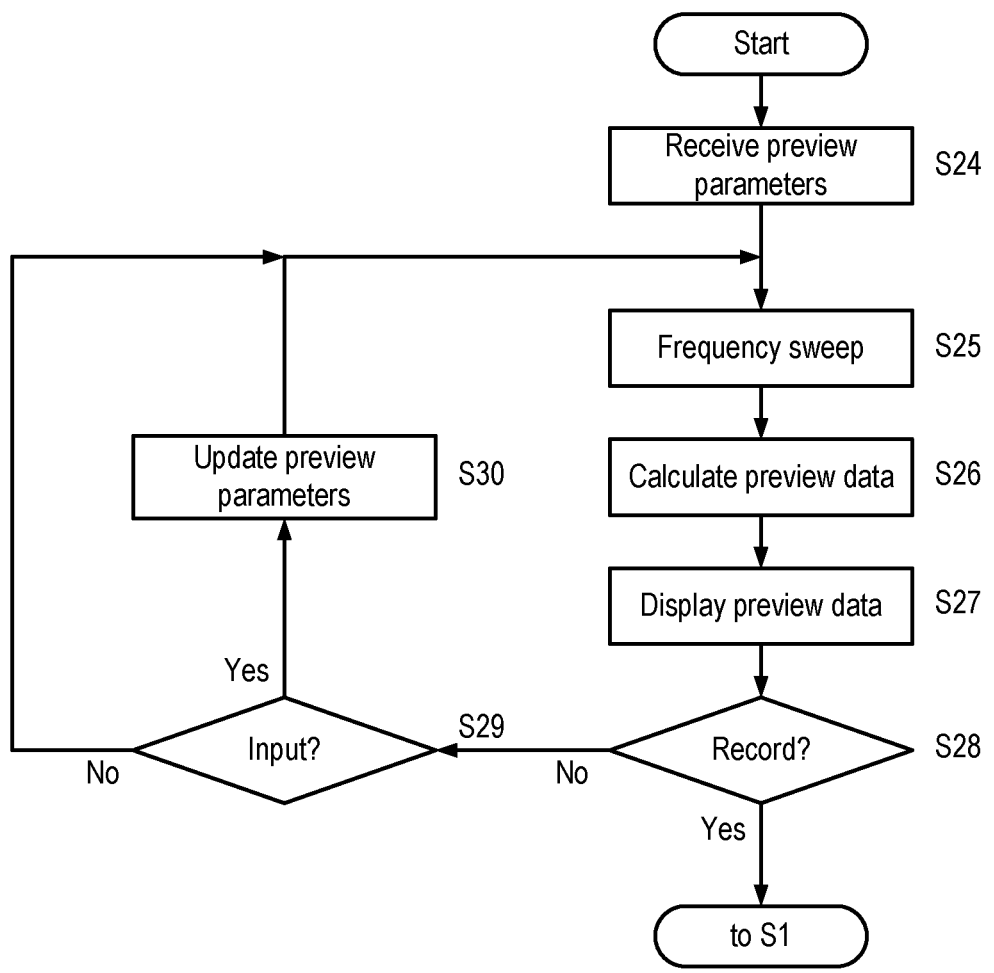
FIG. 6 is a process flow diagram for a method of radio frequency monitoring.
Figure 7:
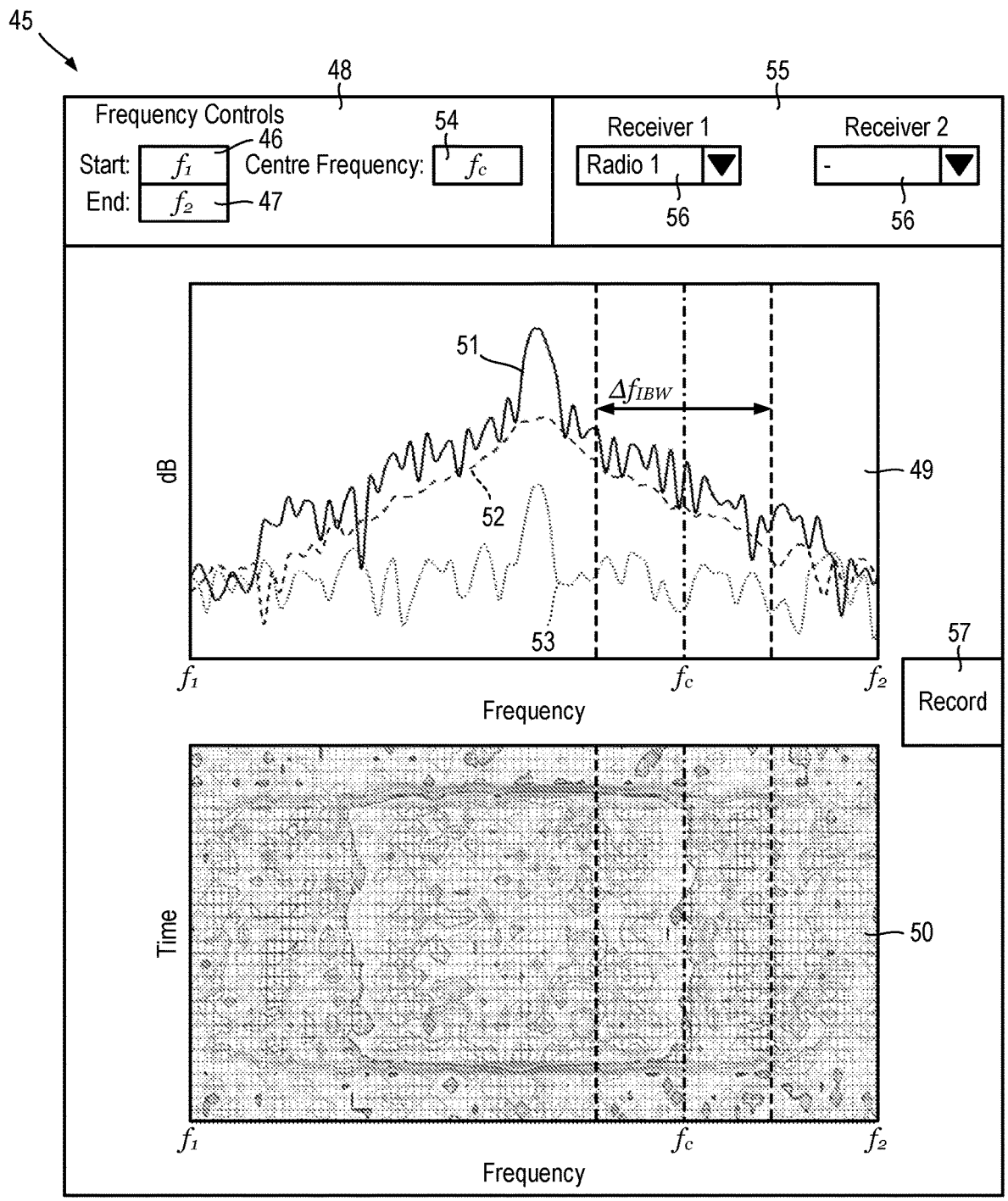
FIG. 7 illustrates an example of a graphical user interface for a client connected to the second system shown in FIG. 5.

Referring also to FIGS. 6 and 7, a method of using the second system 43 for radio frequency (RF) monitoring is illustrated.

A set of preview parameters are received, for example from a Radio Frequency (RF) GUI 45, or the set of preview parameters may be set to default initial values (step S24). The preview parameters may include a lower, start frequency $f_1$ and an upper, end frequency $f_2$. The start and end frequencies $f_1$, $f_2$ may be set using the RF GUI 45, for example, using a start frequency input dialog 46 and an end frequency input dialog 47 of a frequency control pane 48 of the RF GUI 45. Additionally or alternatively, the start and end frequencies $f_1$, $f_2$ may be varied less precisely using, for example, a scroll wheel of a mouse to increase and/or decrease the spacing of start and end frequencies $f_1$, $f_2$. Any appropriate input methods known in the field of GUIs may be used to obtain the required preview parameters from the user.

The RF GUI 45 may be executed by a local or remote client 39, 40. The methods of receiving, storing and processing a time series of data are carried out by one or more processors 34 of the apparatus 32. The RF GUI 45 may be executed as a web application in a browser (not shown) running on the local or remote client 39, 40, in which case the RF GUI 45 application code will be served to the browser (not shown) by one or more processors 34 of the apparatus 32. In such an example, the RF GUI 45 application code will run in the browser (not shown) while the receiving, storing and processing of a time series of data are carried out by one or more processors 34 of the apparatus 32.

The apparatus 32 controls the one or more radio receivers 44 to perform a frequency swept measurement spanning the range between the start and end frequencies $f_1$, $f_2$ (step S25). A frequency sweep may be used when the radio receiver 44 has an instantaneous bandwidth $\Delta f_{IBW}$, which is less than the range $f_2 - f_1$ between start and end frequencies $f_1$, $f_2$. However, when the preview parameters specify start and end frequencies $f_1$, $f_2$ having a range smaller than the instantaneous bandwidth $\Delta f_{IBW}$, a frequency sweep may not be necessary. When two or more radio receivers 44 are connected to the apparatus 32, a frequency sweep may be performed faster by staggering the central frequencies $f_c$ to which each radio receiver 44 is tuned.

The RF GUI 45 may include a radio receiver control pane 55 including controls 56 such as drop-down menus (or any other suitable input element) to allow a user to select one or more radio receivers 44 to be used for collecting one or more time series of data $S_k$. Although a pair of controls 56 are shown in FIG. 7, the number of radio receivers 44 which may be connected to the apparatus 32 is limited only by the available number and/or capacity of processors 34 and associated memories 37.

Preview data are calculated based on IQ data received from the radio receivers 44 (step S26). The number and types of different preview data may depend on the specific application and/or user selections made using the RF GUI 45. The number and type of preview data may be the same as the number m and type of measurements $G^i_j$ and/or the number ma and type of aggregated measurements $H^i n_{h,j}$. Once calculated, the preview data are displayed to the user via the RF GUI 45 (step 27). A refresh rate of the preview data will depend on the time needed for each frequency sweep (step S25), which in turn will depend on the width of the instantaneous bandwidth $\Delta f_{IBW}$ compared to the range $f_2-f_1$ between the start and end frequencies $f_1, f_2$.

In the example shown in FIG. 7, the RF GUI 45 includes a top preview pane 49 and a bottom preview pane 50. The top preview pane 49 shows a persistent spectrum view obtained from the frequency sweep of the radio receivers 44, and the bottom preview pane 50 shows a contour plot of a number of recently obtained spectra. The persistent spectrum view shown in the top preview pane 49 shows the most recently obtained spectrum 51 most prominently, whilst spectra 52, 53 obtained at earlier times are shown with decreasing prominence as the period since they were obtained grows longer. For example, each spectrum may initially be displayed as a solid line of a particular colour, and may change colour and/or fade to transparency over time as the preview data are refreshed.

A further preview parameter received using the RF GUI 45 is the target central frequency $f_c$ (step S24). The target central frequency $f_c$ may be set using a central frequency input 54 of the frequency control pane 48 of the RF GUI 45. Additionally of alternatively, the user may also set the target central frequency $f_c$ by dragging and/or clicking on a position of the preview panes corresponding to the desired target central frequency $f_c$.

When two or more radio receivers 44 are connected to the apparatus 32, they may be tuned to have adjacent or overlapping instantaneous bandwidths $\Delta f_{IBW}$, increasing an effective instantaneous bandwidth for which a time series of data $S_k$ may be recorded. Alternatively, each of two or more radio receivers 44 may be individually tunable to a different central wavelength $f_c$ in order to make independent measurements.

In response to receiving a user command to commence recording (step S28|Yes), the method described hereinbefore in relation to FIGS. 1 to 3N is carried out for IQ data received from the one or more radio receivers (starting step S1). For example, the user may actuate a recording control 57 of the RF GUI 45. When two or more radio receivers 44 are tuned to have adjacent or overlapping instantaneous bandwidths $\Delta f_{IBW}$ in order to provide an increased effective instantaneous bandwidth, the corresponding IQ data may be processed as a single time series of data. When two or more radio receivers 44 are separately tuned for independent measurements, the IQ data from each radio receiver 44 may be processed as a separate time series of data.

If a user command to commence recording has not been received yet (step S28, No), then the RF GUI 45 checks for new or updated user input of the preview parameters (step S29), and updates the preview parameters if necessary (step S30) before repeating the frequency sweep using the existing or updated start and end frequencies $f_1, f_2$ (step S25).

Summary measurements $H^i_{h,j}$ calculated for the IQ data received from the radio receivers 44 may include, without being limited to, frequency spectra of peak power, FFT overlap processed spectra, histograms, heat-maps, or any other data processing suitable to be applied to summarising and/or visually presenting RF data.

Figure 8:
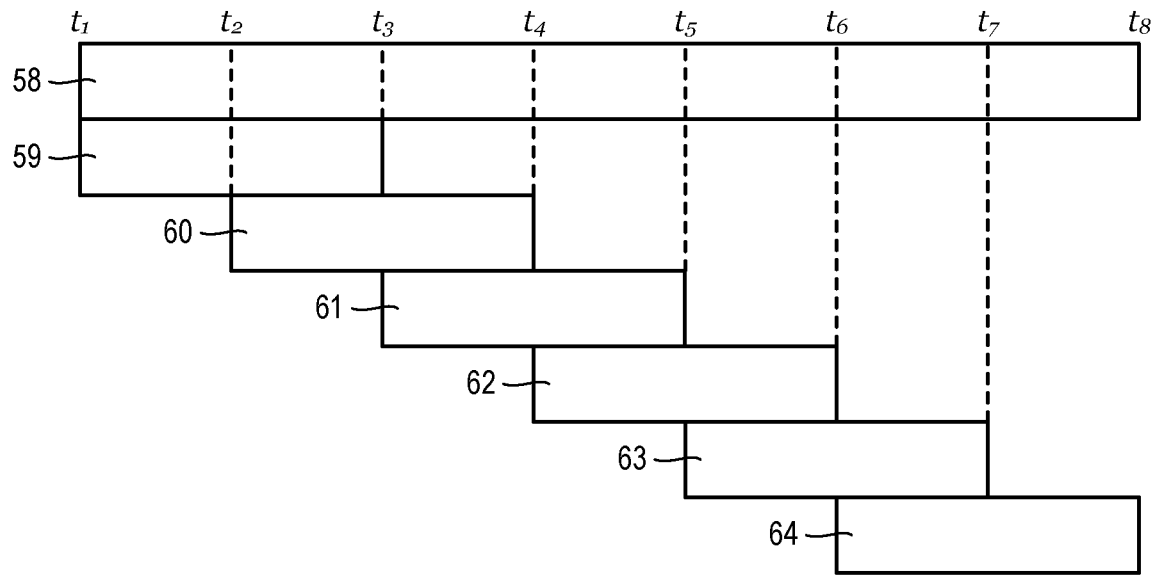
FIG. 8 illustrates fast Fourier transform overlap processing of a time series of data.

Referring also to FIG. 8, FFT overlap processing of a time series of data 58 is illustrated for a case of 0% overlap FFT processing.

For example, the time series of data 58 may correspond to data, such as IQ data, obtained during a single base time period $T_{base}$. A first spectrum 59 is obtained by applying an FFT method to the time series 58 between times $t_1$ and $t_3$. A second spectrum 60 is obtained by applying an FFT method to the time series 58 between times $t_2$ and $t_4$, wherein $t_4-t_2=t_3-t_1$ and $t_2=(t_1+t_3)/2$. Thus there is a 50% overlap in the samples $S_k$ contributing to the first and second spectra 59, 60. The process continues for third, fourth, fifth, sixth spectra 61, 62, 63, 64 and so forth, until the end of the time series of data 58 is reached.

Output from FFT overlap processing may be presented in the form of contour (or 3D surface) plots having time and frequency as x- and y-axes, with the power (less often amplitude) of the spectra as the z-axis. The frequency resolution is determined by the width of the window $(t_3-t_1)$ used for the FFT, whilst the time resolution is related to the amount of overlap $(t_2-t_1)$. At minimum, the window may be shifted by the interval St corresponding to a single sample $S_k$ (i.e. $t_2-t_1=\delta t$). For calculation of summary measurements $G^i_j$, $H^i_{h,j}$ the window size and overlap will be set at the start of recording and will not vary for the duration of recording. However, when query time periods $T_Q$ are tested against a threshold $T_{thresh}$, for $T_Q<T_{thresh}$ the window size and/or window shift (overlap %) may be specified in the user queries (whether live queries or post-recording queries, and whether the user query is manually or automatically generated).

RF GUI 45 illustrates one example of controls 48, 55, 57 and preview data 49, 50, however the method of using the second system 43 is not limited to these specific examples, and any other suitable GUI and/or set of preview data may be used in combination with the second system 43.

Although described in relation to the second system 43 in which data sources 31 take the form of radio receivers 44, the same preview method is equally applicable to other applications and types of sensors. For example, recording and analysis of sensors arranged to monitor manufacturing plants, diagnostics of automobile or aerospace engines based on the outputs from sensors either applied to, or integrated with, the engine, and so forth.

Third System

Figure 9:
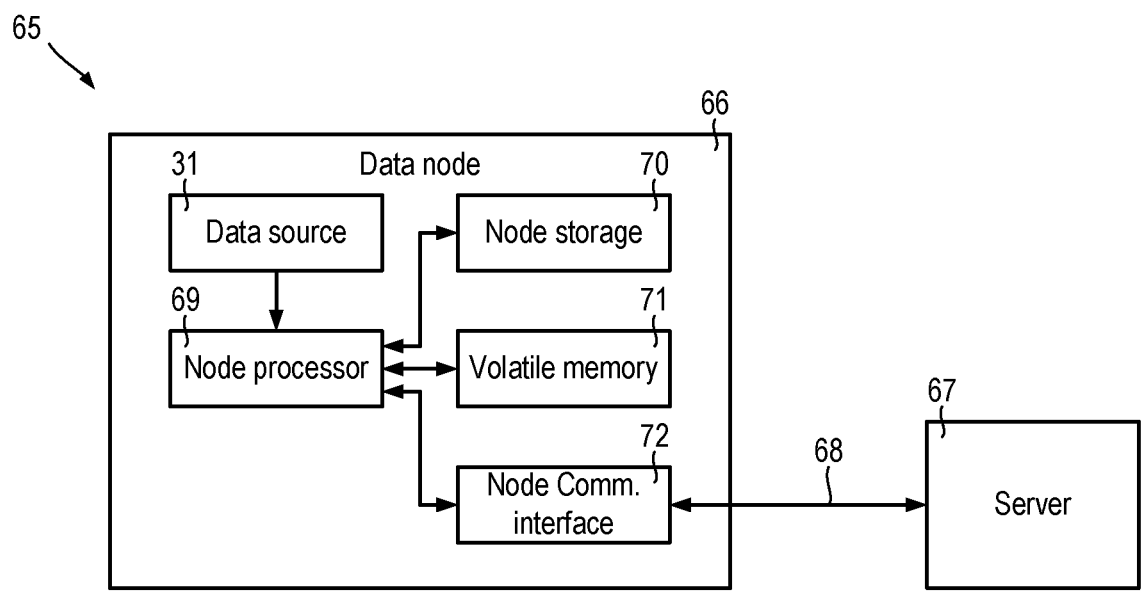
FIG. 9 illustrates a data node of a third system shown in FIG. 10.
Figure 10:
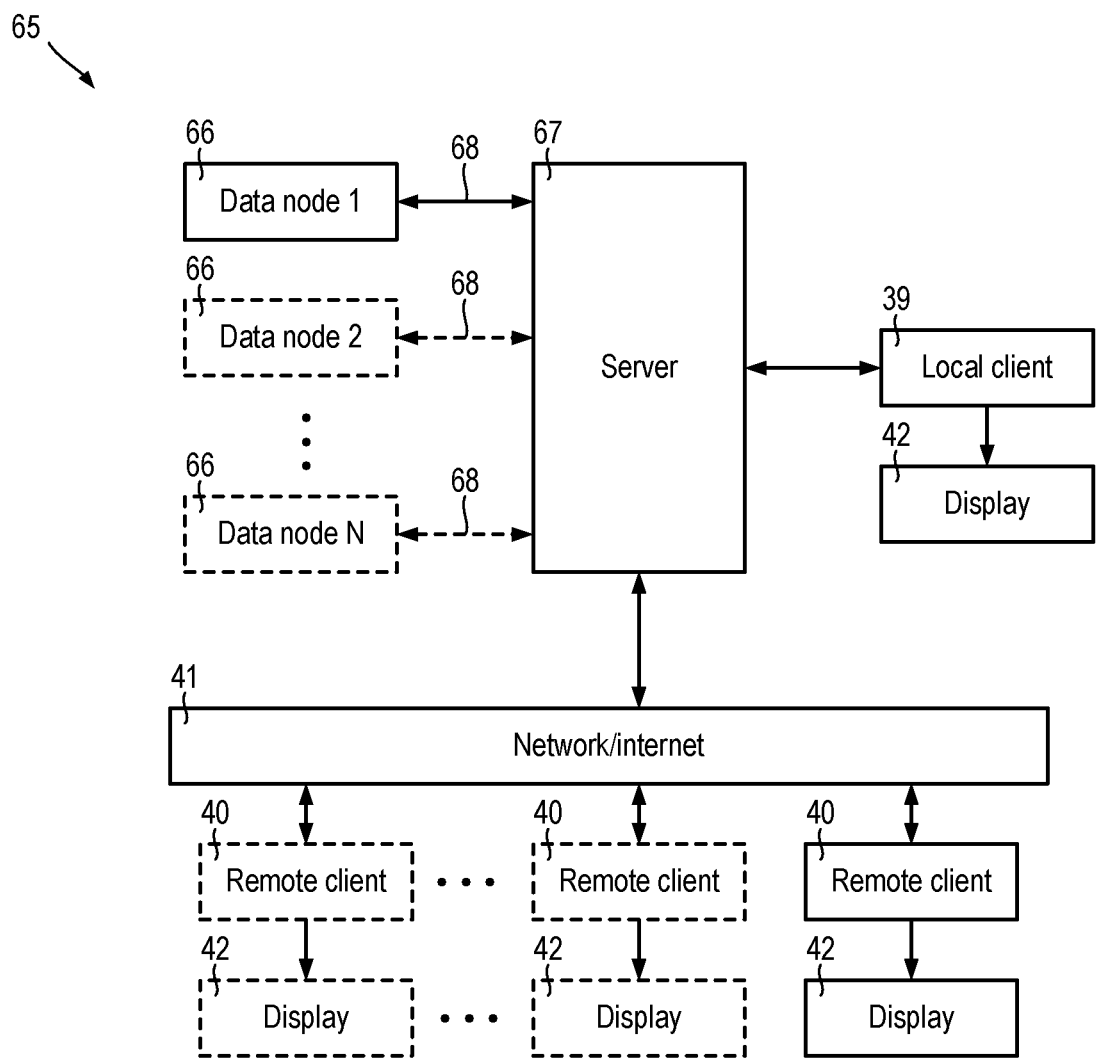
FIG. 10 illustrates a third system for processing one or more time series of data.

Referring also to FIGS. 9 and 10, a third system 65 is shown.

The system 31 and the second system 43 are based on an apparatus 32 which is connected to one or more data sources 31, for example radio receivers 44, by links 33. The system 31 and the second system 43 typically require that the links 33 have sufficient bandwidth to transmit the samples $S_k$ of the time series of data to the apparatus 32, which may limit the distances across which the data sources 31 may be distributed.

The third system 65 includes one or more data nodes 66 connected to a server 67 by links 68. Each data node 66 includes a data source 31, a node processor 69, a node data storage device 70, volatile memory 71 and a node communication interface 72. Each data node 66 corresponds to an example of the apparatus 32 including one processor 34, one data storage device 35 and volatile memory 37, and omitting a local client 39 but integrating a data source 31. The node communication interface 72 provides the link 68 to the server 67.

Each node processor 69 may be a single core processor or a multi-core processor. Each node processor 69 may take the form of one or more digital, electronic programmable central processing units (CPUs) capable of executing code read from a non-transitory medium or a memory (for example node data storage device 70 and/or volatile memory 71) to perform the function and operations of the methods of the present specification. Alternatively, the node processor 69 and the corresponding volatile memory 71 may be provided by a microcontroller. In other examples, the methods described herein may be performed using node processors 69 and volatile memories 71 implemented using any suitable digital signal processing circuit, such as a system-on-a-chip, application specific integrated circuit (ASIC) or field-programmable gate array (FPGA).

Each node data storage device 70 may take the form of one of more non-transitory computer readable media such as, for example, hard disc drives (HDD) and/or solid state drives (SSD). Each node data storage device 70 may take the form of a number of HDDs configured as a Redundant Array of Independent Discs (RAID), or a number of SSDs configured as a Redundant Array of Independent Discs (RAID).

The links 68 connecting the data nodes 65 to the server 67 may take the form of physical connections such as, for example, Ethernet connections, optical fibre links, co-axial cable and so forth. Alternatively, some or all of the links 68 may take the form of wireless links. The links 68 may include one or more networks such as, for example, mobile phone networks, the internet, local area networks, and so forth.

The server 67 includes at least one single or multi-core processor (not shown), volatile memory (not shown) and non-transitory computer readable storage (not shown). The single or multi-core processor (not shown) of the server 67 takes the form of one or more digital, electronic programmable central processing units (CPUs) capable of executing code read from the non-transitory storage (not shown) or memory (not shown) to perform the function and operations of the methods of the present specification.

Each data node 66 uses the corresponding data source 31 to receive or obtain a time series of data (step S1), store the time series of data to the node data storage device 70 (step S2) and to generate binary tree nodes and leaves node(h,j) and summary measurements $G^i_j$, $H^i_{h,j}$ as described hereinbefore (steps S4 through S12). The generated binary tree nodes and leaves node(h,j) and calculated summary measurements $G^i_j$, $H^i_{h,j}$ are stored locally on the node data storage device 70, along with the samples $S_k$ making up the time series of data.

Each data node 66 may send all, or a subset, of the summary measurements $G^i_j$, $H^i_{h,j}$ to the server 67 as they are generated (effectively in real-time) to provide preview data which the server 67 may present to one or more users via local and/or remote clients 39, 40.

Optionally, a data node 66 may include a communication port (not shown), for example a Universal Serial Bus (USB) port or comparable, a data processing device to be connected directly to that data node 66 to interrogate and/or copy the time series of data, the binary tree nodes and leaves node(h,j) and the summary measurements $H^i_{h,j}$.

A data source 31 incorporated in a data node 66 may be any type of sensor such as, for example, a radio receiver, a camera, an oscilloscope or oscilloscope probe, a data-logger, a voltage sensor, a current sensor, an optical sensor, a vibration sensor, an accelerometer, a pH sensor, a flow-meter for a fluid (gas or liquid), a seismometer, or any other type of sensor capable of outputting a detectable signal.

Methods handling of user queries differ between the third system 65 differs and the system 30 or second system 43. The handling of user queries originating from a local or remote client 39, 40 is substantially the same whether after completion of recording a time series of data or during recording of a time series of data, and whether a user query is manually or automatically generated. For queries received after completion of recording, the binary tree structure stored in each data node 66 will have been completely connected using binary tree completion nodes node(h≥1,j) generated as described hereinbefore (step S12). For queries received whilst the third system 65 is still receiving/obtaining a time series of data using a given data node 66, that data node 66 will generate temporary nodes temp(h≥1,j) as described hereinbefore (step S16).

An advantage of the third system 65 is that the samples $S_k$ making up a time series of data may be processed and indexed on the data nodes 66, and do not need to be transmitted to a central apparatus 32. Consequently, the links 68 between data nodes 66 and the server 67 may have reduced bandwidth requirements as compared to the links 33 between data sources 31 such as radio receivers 44 and the apparatus 32 in the system 30 or second system 43. Additionally, if the links 68 to one or more data nodes 66 are temporarily disrupted, those data nodes 66 may continue to receive/obtain, process and index the respective time series of data without interruption. The third system 65 may be better suited to, for example, monitoring a wide geographic area, since the links 68 could be provided by mobile telephone communications networks, even in cases where the data nodes 66 are internally processing very high data rates (for example Mb/s, Gb/s or Tb/s).

First Case

Figure 11:
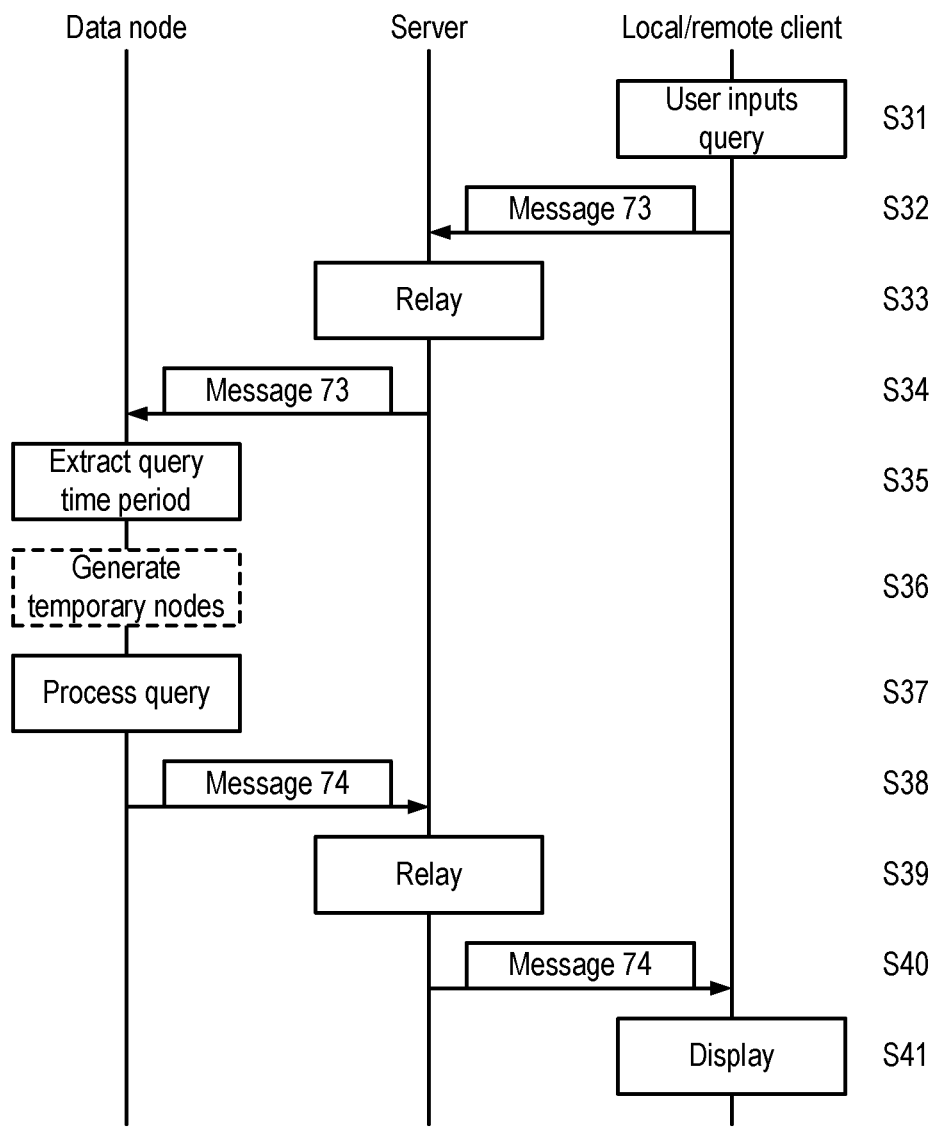
FIG. 11 illustrates a first communication method for a client, a server and a data node of the third system shown in FIG. 10.

Referring also to FIG. 11, a first communication method between a data node 66, the server 67 and a local or remote client 39, 40 is illustrated for a first case of using the third system 65.

A user inputs a query using a local or remote client 39, 40 (step S31). Alternatively, an analysis program (not shown) executed by the local or remote client 39, 40 may generate a query using an API. The user query may be submitted after receiving/obtaining the time series of data has finished, or the user query may be a live query submitted whilst the time series of data is being received/obtained. The local or remote client 39, 40 formats a query message 73 and transmits it to the server 67 (step S32). The query message 73 should include at least a query time period $T_Q$ and an indication of the identity of one or more data nodes 66 from which responses are requested. The query message 73 may optionally include a specification of one or more query measurements and associated parameters.

The server 67 receives the query message 73 and identifies which data nodes 66 the query message 73 is directed to (step S33), then transmits the query message 73 to the identified data nodes 66 (step S34).

A data node 66 receives a query message 73, and extracts the query time period $Q_T$ (step S35), as described hereinbefore (step S15).

If the query message 73 is received whilst the data node 66 is receiving/obtaining a time series of data (live query), then the data node 66 will generate temporary nodes temp (h,j) (step S36), as described hereinbefore (step S16). However, generation of temporary nodes temp(hj) will be unnecessary if the query message 73 is received after the data node 66 has finished receiving/obtaining the time series of data, because binary tree completion nodes node(h≥1,j) will already have been generated (step S12).

The data node 66 processes the query (step $S_{37}$). The data node 66 may simply retrieve the pre-calculated summary measurements $G^i_j$, $H^i_{h,j}$ corresponding to the query time period $T_Q$ as described hereinbefore (step S17). Alternatively, as described hereinbefore with reference to FIG. 4, the data node 66 may select between retrieving pre-calculated summary measurements $G^i_j$, $H^i_{h,j}$ (step S17) or calculating query measurements (steps S21, S22) depending on the result of comparing the query time period $T_Q$ against a threshold Thresh (step S20).

The data node 66 generates a response message 74 and transmits it to the server 67 (step S38). The response message 74 should contain one or more summary measurements $G^i_j$, $H^i_{h,j}$ and/or query measurements, and an identification of the local or remote client 39, 40 which the response message 74 should be forwarded to. Optionally, the response message may include some or all of the samples $S_k$ corresponding to the query time period $Q_T$.

The server 67 receives the response message 74 and identifies which local or remote client 39, 40 the response message 74 is directed to (step S39), then sends the response message 74 to the identified local or remote client 39, 40 (step S40).

The local or remote client 39, 40 presents the summary measurements $G^i_j$, $H^i_{h,j}$ and/or query measurements to the user using a corresponding display 42 (step S41). Optionally, the local or remote client 39, 40 may present some or all of the samples $S_k$ corresponding to the query time period $Q_T$ using the display 42. Presentation of the summary measurements $G^i_j$, $H^i_{h,j}$ and/or query measurements using the corresponding display 42 may be omitted when the user query was automatically generated by an analysis program (not shown) executed by the local or remote client 39, 40.

Second Case

In a second case for using the using the third system 65, the server 67 maintains a local cache of the binary tree structures and summary measurements $G^i_j$, $H^i_{h,j}$ corresponding to each data node 66.

Figure 12:
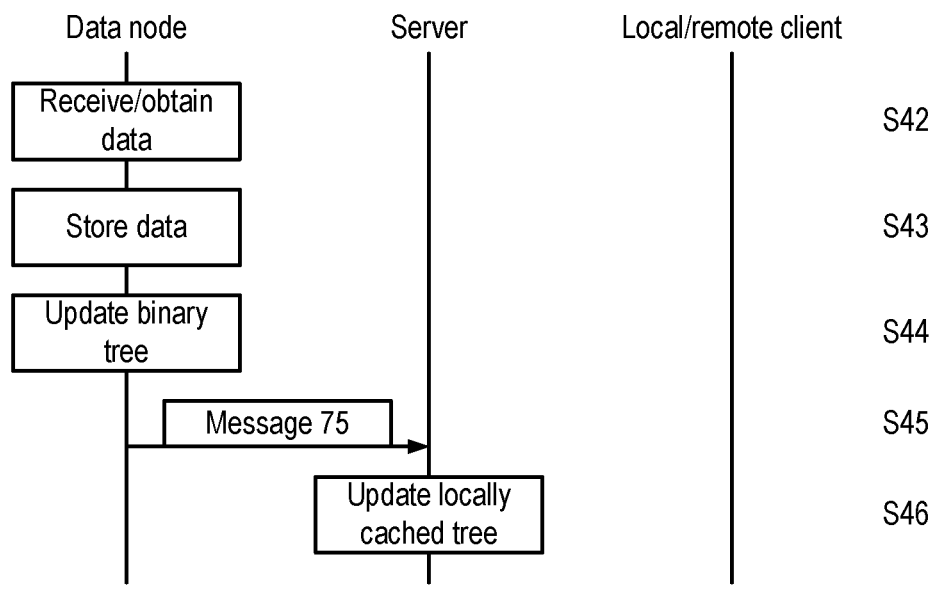
FIG. 12 illustrates a method for a server of the third system shown in FIG. 10 to maintain a local copy of a binary tree index generated by a data node shown in FIG. 9.

Referring also to FIG. 12, a process for local caching of the binary tree nodes and leaves node(h,j) and summary measurements $G^i_j$, $H^i_{h,j}$ on the server 67 is illustrated.

The data node 66 uses the corresponding data source 31 to receive or obtain a time series of data (step S42) in same way explained hereinbefore (step S1).

The data node 66 stores the time series of data to the node data storage device 70 (step S43) in same way explained hereinbefore (step S2).

The data node 66 updates the binary tree structure (step S44). This corresponds to generating binary tree nodes and leaves node(h,j) and calculating summary measurements $G^i_j$, $H^i_{h,j}$ as described hereinbefore (steps S4 through S12). The generated binary tree nodes and leaves node(h,j) and calculated summary measurements $G^i_j$, $H^i_{h,j}$ are stored locally on the node data storage device 70, along with the samples $S_k$ making up the time series of data.

Additionally, the data node 66 prepares and transmits a tree update message 75 to the server 67 (step S45). The data node 66 may transmit a tree update message 75 every time the data node 66 updates the binary tree structure. Alternatively, the data node 66 may accumulate new binary tree nodes and leaves node(h,j) and corresponding summary measurements $G^i_j$, $H^i_{h,j}$ for a predetermined period before transmitting a tree update message 75.

The server 67 receives the tree update message 75, adds the new binary tree nodes and leaves node(h,j) to a locally cached copy of the binary tree structure, and stores the corresponding summary measurements $G^i_j$, $H^i_{h,j}$ (step S46).

Maintaining a locally cached copy of the binary tree structure enables the server 67 to respond to user queries without necessarily needing to communicate with the data nodes 66.

For example, the server may receive the query message 73, extract the query time period $T_Q$ (step S15, S35), generate temporary nodes if needed (step S16, S36), then retrieve the pre-calculated summary measurements $G^i_j$, $H^i_{h,j}$ relevant to the query time period $T_Q$ (step S37) as described hereinbefore (step S17) with reference to FIG. 4.

Figure 13:
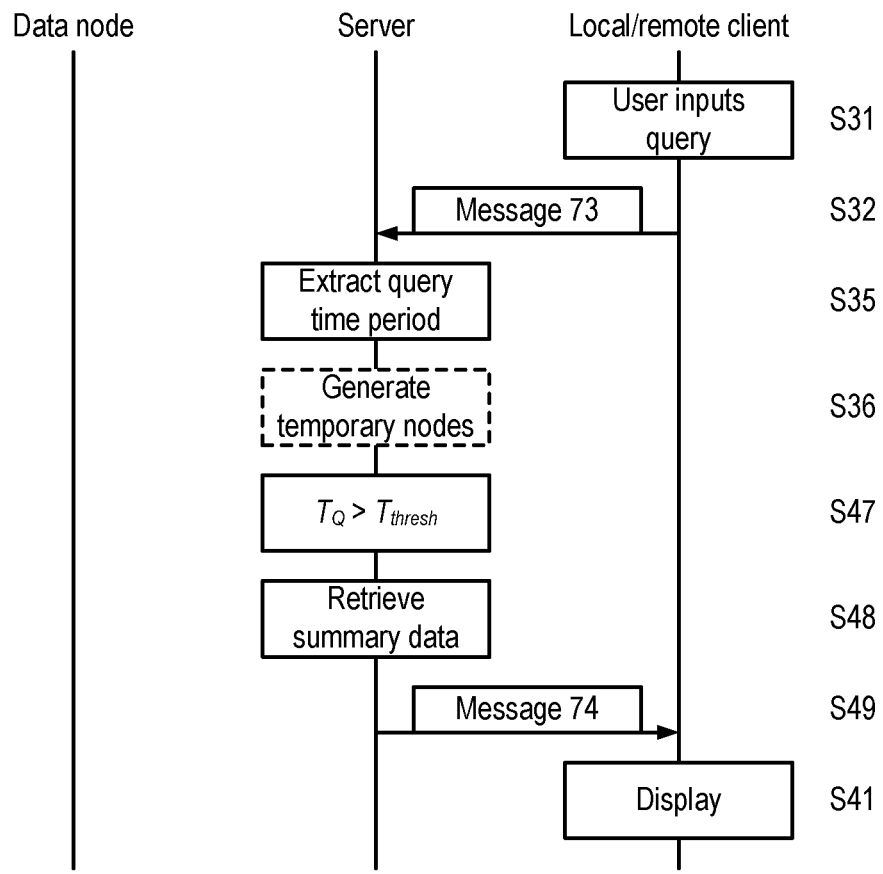
FIG. 13 illustrates a second communication method for a client, a server and a data node of the third system shown in FIG. 10.
Figure 14:
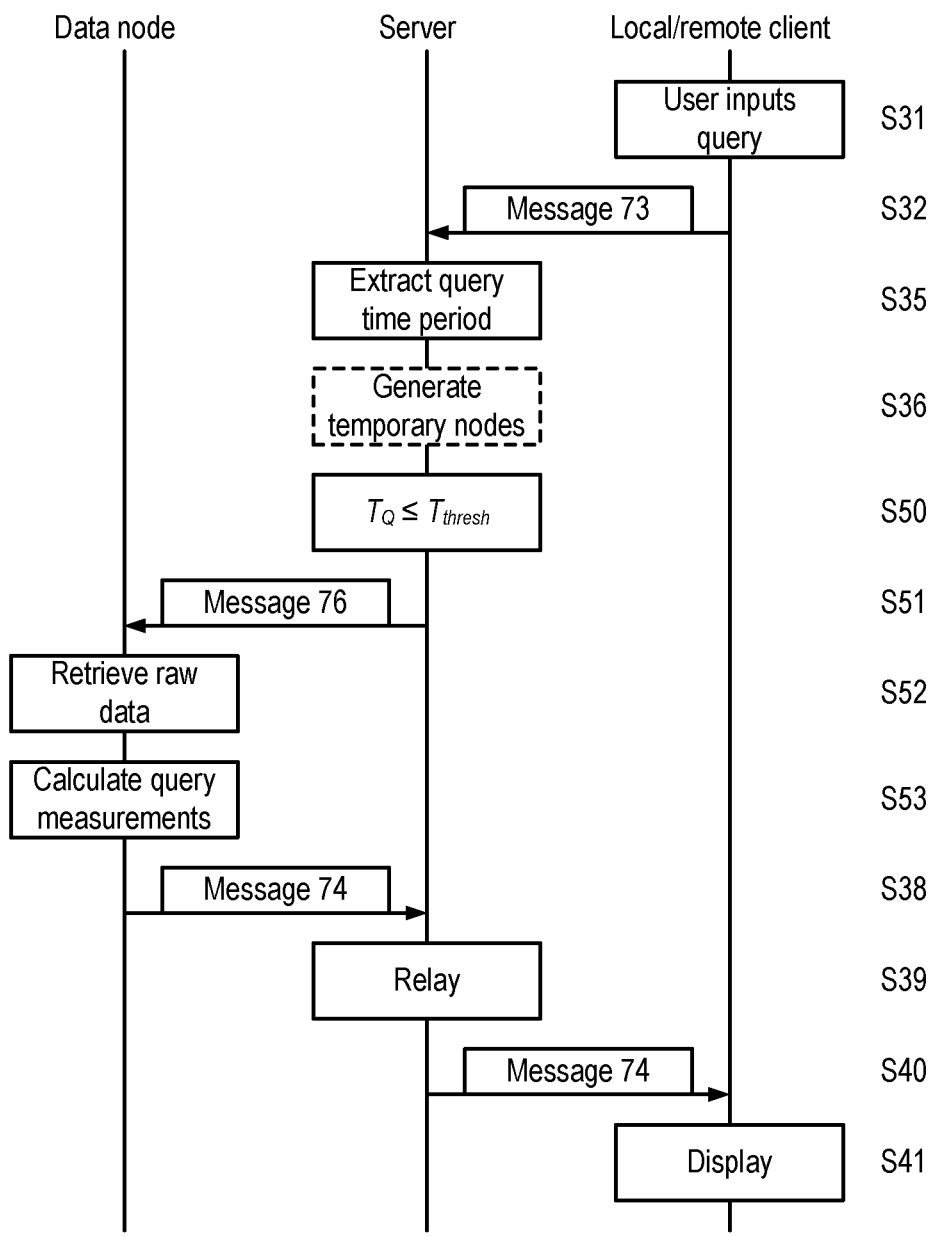
FIG. 14 illustrates a third communication method for a client, a server and a data node of the third system shown in FIG. 10.

Referring also to FIGS. 13 and 14, the handling of user queries in the second case may need to be modified if the query time period $T_Q$ is compared against a threshold $T_{thresh}$.

Referring in particular to FIG. 13, a second communication method between the server 67 and a local or remote client 39, 40 is illustrated for the second case of using the third system 65, in the situation that the query time period $T_Q$ exceeds the threshold $T_{thresh}$.

A user inputs a query using a local or remote client 39, 40 (step S31). Alternatively, an analysis program (not shown) executed by the local or remote client 39, 40 may generate a query using an API. The user query may be submitted after receiving/obtaining the time series of data has finished, or the user query may be a live query submitted whilst the time series of data is being received/obtained. The local or remote client 39, 40 formats a query message 73 and transmits it to the server 67 (step S32). The query message 73 should include information as described in relation to the first case (FIG. 11).

The server 67 receives the query message 73 and identifies which data nodes 66 the query message 73 concerns, then extracts the query time period $Q_T$ (step S35), as described hereinbefore (step S15) with reference to FIG. 4.

If the query message 73 is received whilst the respective data node 66 is receiving/obtaining a time series of data (live query), then the server 67 will generate temporary nodes temp(h,j) (step S36), as described hereinbefore (step S16) with reference to FIG. 4. However, this step will be unnecessary if the query message 73 is received after the respective data node 66 has finished receiving/obtaining the time series of data, as binary tree completion nodes node(h≥1,j) will already exist (step S12).

The server 67 determines that the query time period $T_Q$ exceeds the threshold $T_{thresh}$ (step S47), and consequently is able to process the query without the need to obtain further information from the relevant data node(s) 66. The server 67 retrieves the pre-calculated summary measurements $G^i_j$, $H^i_{h,j}$ relevant to the query time period $T_Q$ (step S48) as described hereinbefore (step S17) with reference to FIG. 4.

The server 67 generates a response message 74 and transmits it to the local or remote client 39, 40 which submitted the query message 73 (step S49). The local or remote client 39, 40 presents the summary measurements $G^i_j$, $H^i_{h,j}$ to the user using a corresponding display 42 (step S41). Presentation of the summary measurements $H^i_{h,j}$ and/or query measurements using the corresponding display 42 may be omitted when the user query was automatically generated by an analysis program (not shown) executed by the local or remote client 39, 40.

Referring in particular to FIG. 14, a third communication method between the server 67 and a local or remote client 39, 40 is illustrated for the second case of using the third system 65, in the situation that the query time period $T_Q$ does not exceed the threshold $T_{thresh}$.

A user inputs a query using a local or remote client 39, 40 (step S31). Alternatively, an analysis program (not shown) executed by the local or remote client 39, 40 may generate a query using an API. The user query may be submitted after receiving/obtaining the time series of data has finished, or the user query may be a live query submitted whilst the time series of data is being received/obtained. The local or remote client 39, 40 formats a query message 73 and transmits it to the server 67 (step S32). The query message 73 should include information as described in relation to the first case (FIG. 11).

The server 67 receives the query message 73 and identifies which data nodes 66 the query message 73 concerns, then extracts the query time period $Q_T$ (step S35) as described hereinbefore (step S15) with reference to FIG. 4.

If the query message 73 is received whilst the data node 66 is receiving/obtaining a the time series of data (live query), then the server 67 will generate temporary nodes temp(h,j) (step S36), in the same way described hereinbefore (step S16) in relation to live queries of the system 30. However, this step will be unnecessary if the query message 73 is received after the third system 65 has finished receiving/obtaining the time series of data, as binary tree completion nodes node(h≥,j) will already exist (step S12).

The server 67 determines that the query time period $T_Q$ does not exceed the threshold $T_{thresh}$ (step S50), and consequently processing the query requires further data which is stored on the relevant data nodes 66.

The server 67 generates one or more query measurement messages 76 and transmits these to the relevant data node(s) 66 (step S51). A query measurement message 76 includes the same information as the query message 73, and additionally includes either a copy of the temporary nodes temp(h≥1,j) generated by the server 67, or an identification of the specific raw data samples $S_k$ corresponding to the query time period $T_Q$.

A data node 66 receives the query measurement message 76 and retrieves the raw data samples $S_k$ corresponding to the query time period $T_Q$ (step S52) as described hereinbefore (step S21) with reference to FIG. 4. The data node 66 calculates the query measurements (step S53) as described hereinbefore (step S22) with reference to FIG. 4.

The data node 66 generates a response message 74 and transmits it to the server 67 (step S38). The response message 74 contains the one or more calculated query measurements, and an identification of the local or remote client 39, 40 which the response message 74 should be forwarded to.

The server 67 receives the response message 74 and identifies which local or remote client 39, 40 the response message 74 is directed to (step S39), then transmits the response message 74 to the identified local or remote client 39, 40 (step S40). Optionally, the response message may include some or all of the samples $S_k$ corresponding to the query time period $Q_T$.

The local or remote client 39, 40 presents the query measurements to the user using a corresponding display 42 (step S41). Optionally, the local or remote client 39, 40 may present some or all of the samples $S_k$ corresponding to the query time period $Q_T$ using the display 42. Presentation of the summary measurements $G^i_j$, $H^i_{h,j}$ and/or query measurements using the corresponding display 42 may be omitted when the user query was automatically generated by an analysis program (not shown) executed by the local or remote client 39, 40.

In an variation to the communication sequence for the second case, the step of generating temporary nodes temp (h,j) (step S36) may be deferred until after the query time period $T_Q$ has been compared against the threshold Thresh. If necessary, generation of temporary nodes temp(h,j) (step S36) may be carried out by the server 67 if $T_Q > T_{thresh}$, or by the data node(s) 66 if $T_Q \leq T_{thresh}$.

Modifications

It will be appreciated that various modifications may be made to the embodiments hereinbefore described. Such modifications may involve equivalent and other features which are already known in the design and use of methods and apparatuses for receiving, storing and/or processing time-series of data, and which may be used instead of or in addition to features already described herein. Features of one embodiment may be replaced or supplemented by features of another embodiment.

In some examples the time series of data may correspond to a series of images or frames of a video. A heat-map could be generated and stored for each base time period $T_{base}$, based on the amount of change of that pixel during the period $T_{base}$ (an example of a measurement $G^i_j$). In this way, active pails of the field of view would correspond to high values whilst inactive or static pails of the field of view would correspond to low values. Such image heat-maps could be aggregated (for example by summing and optional renormalizing) to provide aggregated measurements $H^i_{h,j}$ associated with binary tree nodes node(h≥1,j). When reviewing video data indexed in this way, the image would become 'clearer' as you focus in on activity/inactivity of a particular time period, with the option to switch to viewing the original video frames at the lowest (leaf) level.

In some examples, the apparatus 32 may omit the communications interface 36, for example when only a local client 39 is required.

Although examples have been described in which the aggregated measurements $H^i_{h,j}$ are the same for each root/branch binary tree node node(h≥1,j), this need not be the case and the number ma and type of aggregated measurements $H^i_{h,j}$ may be varied depending on the height h of a binary tree node node(h≥1,j). For example, any aggregated measurements $H^i_{h,j}$ which require calculation based on the corresponding samples $S_k$ may be omitted for binary tree nodes node(h≥1,j) above a threshold height h, in order to avoid lengthy processing which could slow down indexing. By contrast, any aggregated measurements $H^i_{h,j}$ which may be based on lower level aggregated measurements $H^i_{h-1,j}$ may be maintained regardless of height h.

Although claims have been formulated in this application to particular combinations of features, it should be understood that the scope of the disclosure of the present invention also includes any novel features or any novel combination of features disclosed herein either explicitly or implicitly or any generalization thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

The invention claimed is:

1. A method comprising:
receiving or obtaining a time series of data;
storing the time series of data to a storage device without interrupting the reception of the time series of data;
for each of a plurality of base time periods, at the end of a most recently elapsed base time period and without interrupting the reception or storage of the time series of data:
  calculating one or more measurements based on the time series of data corresponding to the most recently elapsed base time period;
  updating a binary tree structure indexing the one or more measurements and the time series of data by:
    generating a new binary tree leaf corresponding to the most recently elapsed base time period; and
    in response to a perfect binary sub-tree can be completed which includes the new binary tree leaf by adding one or more new binary tree nodes generating those new binary tree nodes to complete the perfect binary sub-tree;
    wherein the binary tree structure includes one or more root nodes;
    wherein leaves and nodes of the binary tree structure are read-only once generated;
  wherein each binary tree leaf comprises one or more pointers to measurements based on the corresponding base time period and each binary tree node comprises one or more pointers to aggregated measurements based on all descendant base time periods.

2. A method according to claim 1, further comprising in response to termination of the time series of data:
generating a final binary tree leaf corresponding to the time series of data received since the last completely elapsed base time period;
generating any binary tree nodes required to link all existing portions of the binary tree structure to a single binary tree root node.

3. A method according to claim 1, further comprising:
receiving a user query during reception of the time series of data, the query specifying a query time period;
generating any temporary binary tree nodes required to link all existing portions of the binary tree structure to a single temporary binary tree root node;
using the binary tree structure and the temporary binary tree nodes to determine or retrieve measurements, aggregated measurements and/or data corresponding to the query time period.

4. A method according to claim 3, wherein using the binary tree structure and the temporary binary tree nodes to retrieve measurements, aggregated measurements and/or data corresponding to the query time period comprises:
determining whether the query time period exceeds a threshold value;
in response to the query time period exceeds the threshold value, using the binary tree structure and the temporary binary tree nodes to retrieve measurements and/or aggregated measurements corresponding to the query time period;
in response to the query time period does not exceed the threshold value:
  using the binary tree structure and the temporary binary tree nodes to retrieve the portion of the time series of data corresponding to the query time period;
  calculating one or more query measurements based on the time series of data corresponding to the query time period.

5. A method comprising:
applying the method of claim 1 to two or more time series of data in parallel.

6. A method according to claim 1, wherein the one or more measurements comprise information obtained based on fast Fourier Transform overlap processing applied to the time series of data corresponding to the most recently elapsed base time period.

7. A method according to claim 1, wherein the time series of data is in-phase and quadrature, IQ, data received from one or more radio receivers.

8. A computer program product configured to cause a data processing apparatus connected to one or more storage devices to execute a method according to claim 1.

9. A method comprising:
receiving one or more preview parameters, the preview parameters including a preview bandwidth;
controlling one or more radio receivers to perform a frequency sweep and obtain preview spectrum information spanning the preview bandwidth;
displaying the preview spectrum information;
receiving a selection of one or more frequency bands;
tuning each of the one or more radio receivers to one of the selected frequency bands;
acquiring a time series of data from the one or more radio receivers and applying the method according to claim 1 to the time series.

10. An apparatus comprising:
a storage device;
one or more processors;
memory;
wherein the apparatus is configured to:
receive or obtain a time series of data;
store the time series of data to the storage device without interrupting the reception of the time series of data;
for each of a plurality of base time periods, at the end of a most recently elapsed base time period and without interrupting the reception or storage of the time series of data:
  calculate one or more measurements based on the time series of data corresponding to the most recently elapsed base time period;
  update a binary tree structure indexing the one or more measurements by:
    generating a new binary tree leaf corresponding to the most recently elapsed base time period; and
    in response to a perfect binary sub-tree can be completed which includes the new binary tree leaf by adding one or more new binary tree nodes, generating the those new binary tree nodes to complete the perfect binary sub-tree;
    wherein the binary tree structure includes one or more root nodes;
    wherein leaves and nodes of the binary tree structure are read-only once generated;
  wherein each binary tree leaf comprises one or more pointers to measurements based on the corresponding base time period and each binary tree node comprises one or more pointers to aggregated measurements based on all descendant base time periods.

11. An apparatus according to claim 10, wherein in response to termination of the time series of data, the apparatus is further configured to:
generate a final binary tree leaf corresponding to the time series of data received since the last completely elapsed base time period;

generate any binary tree nodes required to link all existing portions of the binary tree structure to a single binary tree root node.

12. An apparatus according to claim 10, wherein the apparatus is further configured to:
receive a user query during reception of the time series of data, the query specifying a query time period;
generate any temporary binary tree nodes required to link all existing portions of the binary tree structure to a single temporary binary tree root node;
use the binary tree structure and the temporary binary tree nodes to retrieve measurements, aggregated measurements and/or data corresponding to the query time period.

13. An apparatus according to claim 12, wherein using the binary tree structm and the temporary binary tree nodes to retrieve measurements, aggregated measurements and/or data corresponding to the query time period comprises:
determining whether the query time period exceeds a threshold value;
in response to the query time period exceeds the threshold value, using the binary tree structure and the temporary binary tree nodes to retrieve measurements and/or aggregated measurements corresponding to the query time period;
in response to the query time period does not exceed the threshold value:
using the binary tree structure and the temporary binary tree nodes to retrieve the portion of the time series of data corresponding to the query time period;
calculating one or more query measurements based on the time series of data corresponding to the query time period.

14. An apparatus according to claim 10, further comprising one or more radio receivers, wherein the time series of data is in-phase and quadrature, IQ data received from one or more radio receivers.

15. An apparatus according to claim 10, wherein the apparatus is configured to process two or more time series of data in parallel.

16. An apparatus according to claim 10, wherein the one or more measurements comprise information obtained based on fast Fourier Transform overlap processing applied to the time series of data corresponding to the most recently elapsed base time period.

17. A system comprising:
an apparatus according to claim 10;
one or more user clients configured for communication with the apparatus.

18. A system comprising:
one or more data collection nodes, each data collection node comprising an apparatus according to claim 10; and
a server configured for communication with each of the one or more data collection nodes;
one or more user clients configured for communication with the server.

19. A system according to claim 18, wherein for each data collection node, during reception of time series of data:
that data collection node transmits newly generated binary tree nodes to the server;
the server stores a local copy of the binary tree structure stored by that data collection node.

20. A system according to claim 18, wherein for each data collection node, during reception of time series of data:
that data collection node transmits newly generated measurements and/or aggregated measurements to the server;
the server stores a local copy of measurements and/or aggregated measurements corresponding to the binary tree structure stored by that data collection node.

* * * * *

UNITED STATES PATENT AND TRADEMARK OFFICE
CERTIFICATE OF CORRECTION

PATENT NO. : 11,960,462 B2  
APPLICATION NO. : 17/800075  
DATED : April 16, 2024  
INVENTOR(S) : Stewart Hyde et al.

Page 1 of 1

It is certified that error appears in the above-identified patent and that said Letters Patent is hereby corrected as shown below:

In the Claims

In Column 31, Claim 1, Line 19, "tree nodes" should read --tree nodes,--

In Column 32, Claim 10, Line 51, "generating the those" should read --generating those--

In Column 33, Claim 13, Line 15, "tree structm" should read --tree structure--

In Column 33, Claim 14, Line 35, "quadrature, IQ data" should read --quadrature, IQ, data--

Signed and Sealed this  
Eighth Day of October, 2024

Katherine Kelly Vidal  
*Director of the United States Patent and Trademark Office*